US012752809B2

(12) United States Patent
Sato et al.

(10) Patent No.: US 12,752,809 B2
(45) Date of Patent: Oct. 6, 2026

(54) DRIVING ASSISTANCE APPARATUS AND RECORDING MEDIUM

(71) Applicant: SUBARU CORPORATION, Tokyo (JP)

(72) Inventors: Noeru Sato, Tokyo (JP); Ryuichi Sumikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 134 days.

(21) Appl. No.: 18/691,658

(22) PCT Filed: Oct. 6, 2022

(86) PCT No.: PCT/JP2022/037454
§ 371 (c)(1),
(2) Date: Mar. 13, 2024

(87) PCT Pub. No.: WO2024/075249
PCT Pub. Date: Apr. 11, 2024

(65) Prior Publication Data
US 2025/0128725 A1 Apr. 24, 2025

(51) Int. Cl.
*B60W 50/14* (2020.01)
*B60W 40/08* (2012.01)
*B60W 50/00* (2006.01)

(52) U.S. Cl.
CPC ............ *B60W 50/14* (2013.01); *B60W 40/08* (2013.01); *B60W 2040/0827* (2013.01);
(Continued)

(58) Field of Classification Search
CPC ................. B60W 50/14; B60W 40/08; B60W 2540/229; B60W 2040/0827
(Continued)

(56) References Cited

U.S. PATENT DOCUMENTS

2019/0017840 A1* 1/2019 Okamoto ........... G01C 21/3655

FOREIGN PATENT DOCUMENTS

JP 2006-329713 A 12/2006
JP 2018-120352 A 8/2018
(Continued)

OTHER PUBLICATIONS

Office Action dated Jul. 29, 2025, issued in corresponding Japanese patent application No. 2024-555557, 4 pages.
(Continued)

*Primary Examiner* — Kam Wan Ma
(74) *Attorney, Agent, or Firm* — Rimon P.C.

(57) ABSTRACT

A driving assistance apparatus that alerts a driver based on a difficulty of driving includes an effect level storage that records a degree of an effect that stabilizes a vehicle body behavior while the driver is driving by executing a sound effect output process of outputting a sound effect based on the vehicle body behavior. The apparatus executes a difficulty determination process of determining the difficulty of driving for each predetermined section in which an own vehicle is scheduled to travel. The apparatus executes an alerting process of selectively executing, based on the difficulty, the sound effect output process or a warning process that gives a warning to the driver. The driving assistance apparatus sets respective ranges of the difficulty of driving for executing the sound effect output process and the warning process in the alerting process, based on the recorded degree of the effect of the driver.

14 Claims, 14 Drawing Sheets

DRIVING SKILL LEVEL 1

EFFECT LEVEL 1

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | | | WARNING | | | | |

SOUND EFFECT OUTPUT

EFFECT LEVEL 2

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | SOUND EFFECT OUTPUT | | | WARNING | | | |

EFFECT LEVEL 3

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | SOUND EFFECT OUTPUT | | | | WARNING | | |

(52) U.S. Cl.
CPC ............... *B60W 2050/0083* (2013.01); *B60W 2050/143* (2013.01); *B60W 2540/229* (2020.02)

(58) Field of Classification Search
USPC .......................................................... 340/576
See application file for complete search history.

(56) References Cited

FOREIGN PATENT DOCUMENTS

| | | | |
|---|---|---|---|
| JP | 2018-180968 | A | 11/2018 |
| JP | 2018-206249 | A | 12/2018 |
| WO | 2017/141376 | A1 | 8/2017 |

OTHER PUBLICATIONS

International Search Report received in PCT Application No. PCT/JP2022/037454, dated Dec. 27, 2022.

* cited by examiner

[ FIG. 1 ]
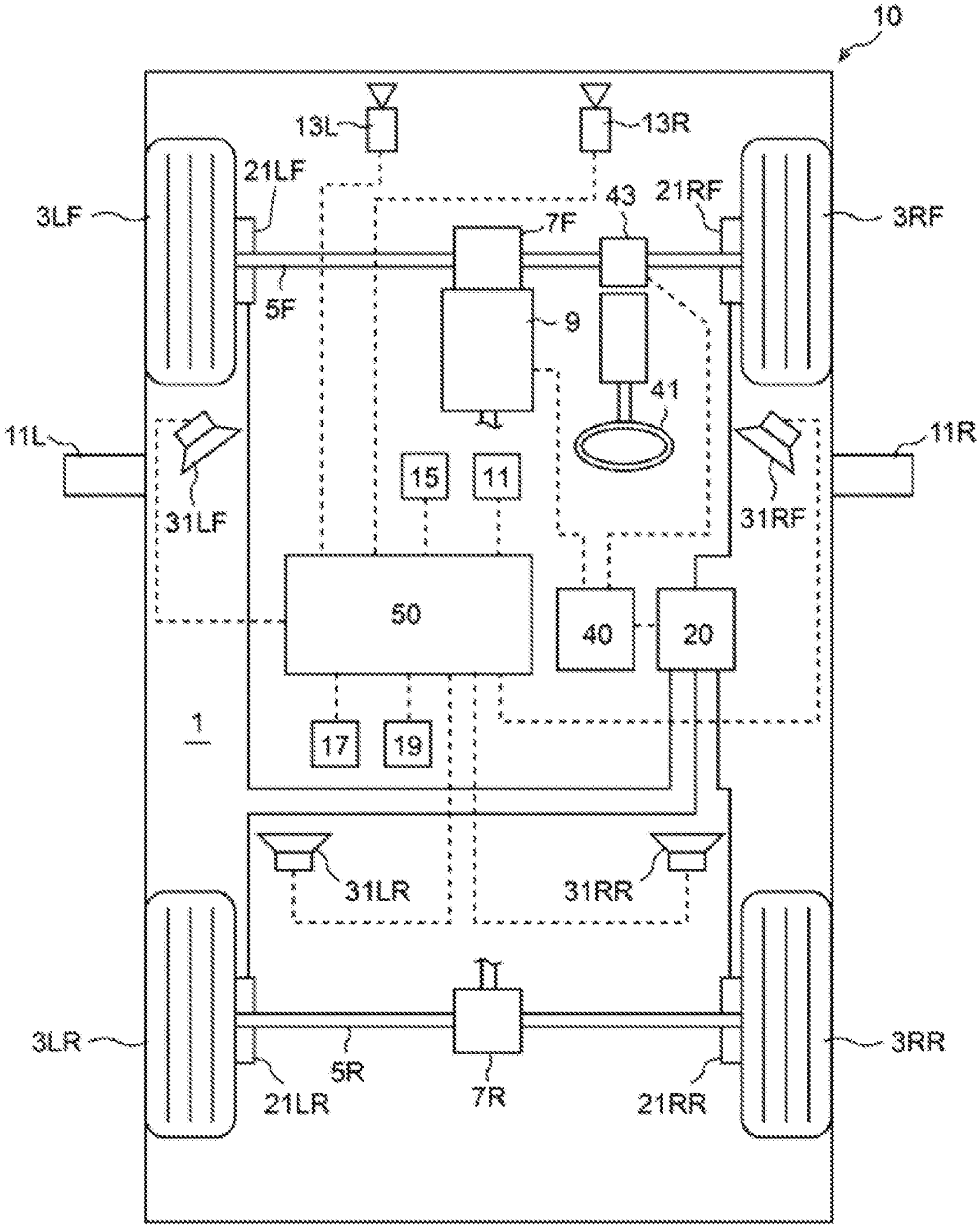

[ FIG. 2 ]
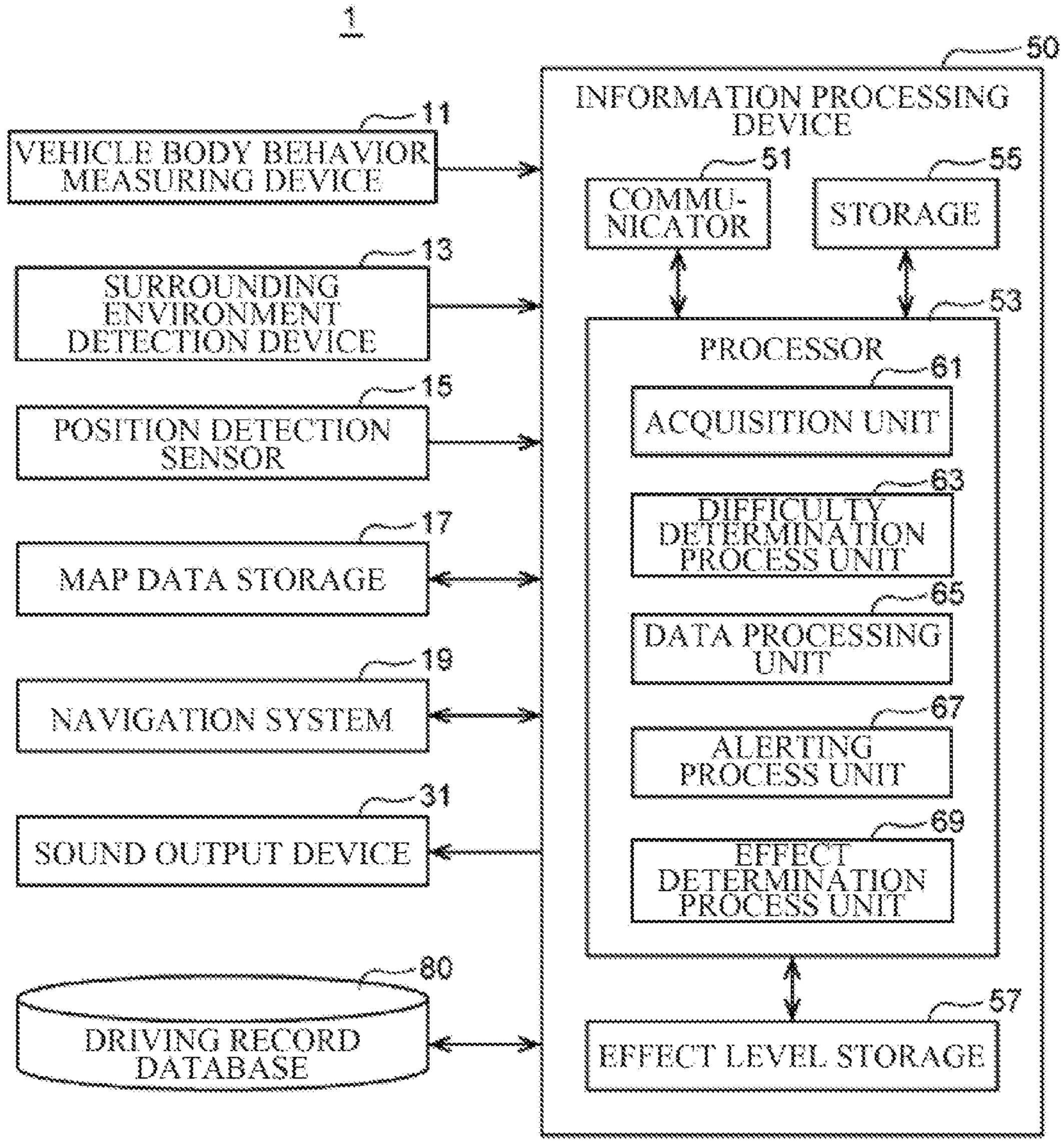

[ FIG. 3 ]
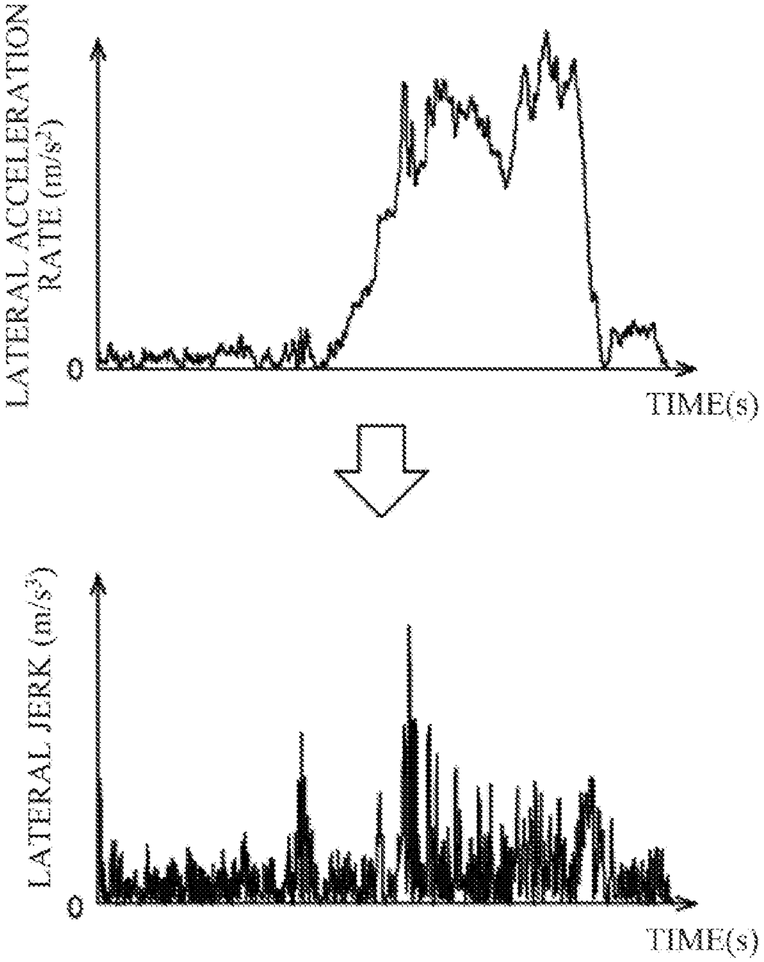
[ FIG. 4 ]
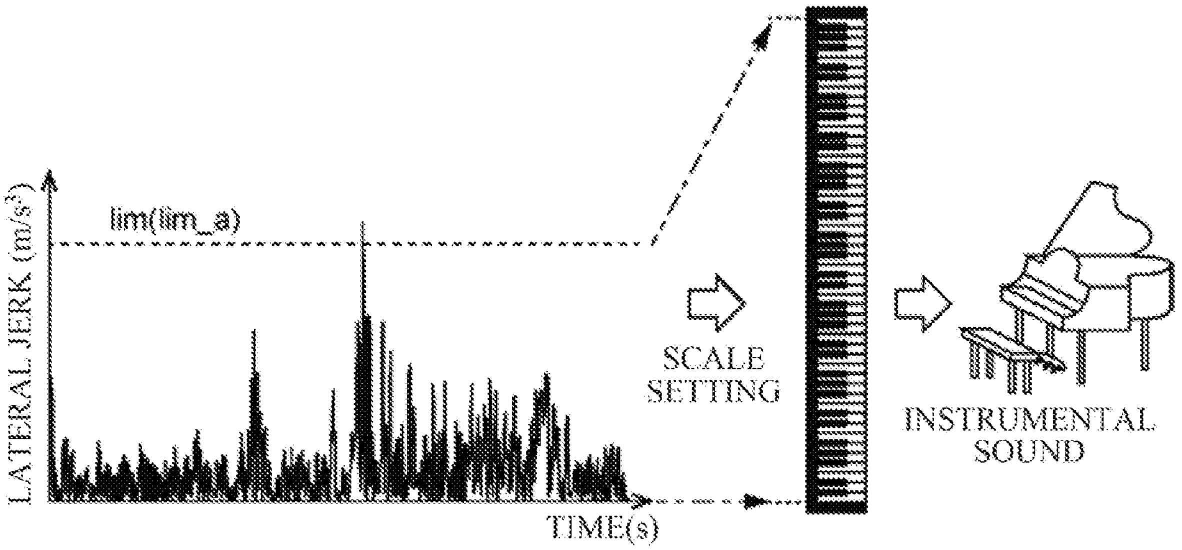

[ FIG. 5 ]
EFFECT LEVEL 1
| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | | SOUND EFECT OUTPUT | | WARNING | | | |
EFFECT LEVEL 2
| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | | SOUND EFECT OUTPUT | | | WARNING | | |
EFFECT LEVEL 3
| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | | SOUND EFECT OUTPUT | | | | WARNING | |
[ FIG. 6 ]
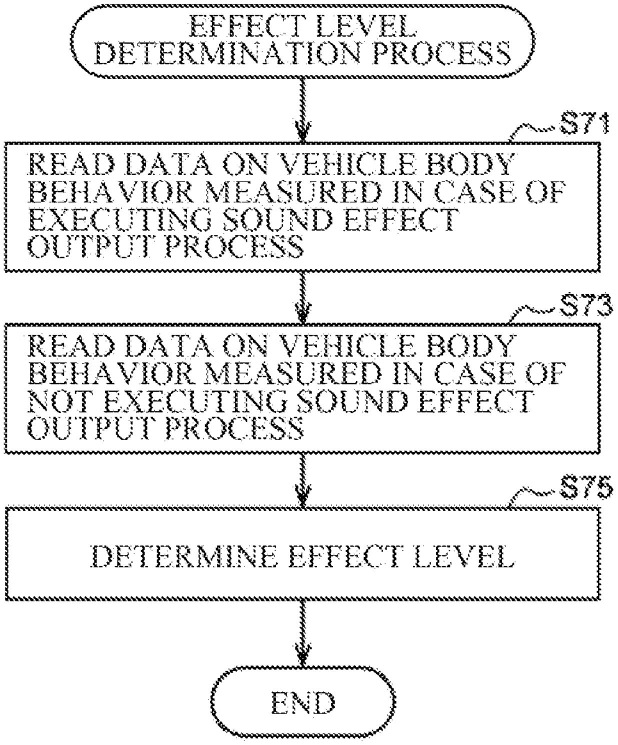

[ FIG. 7 ]
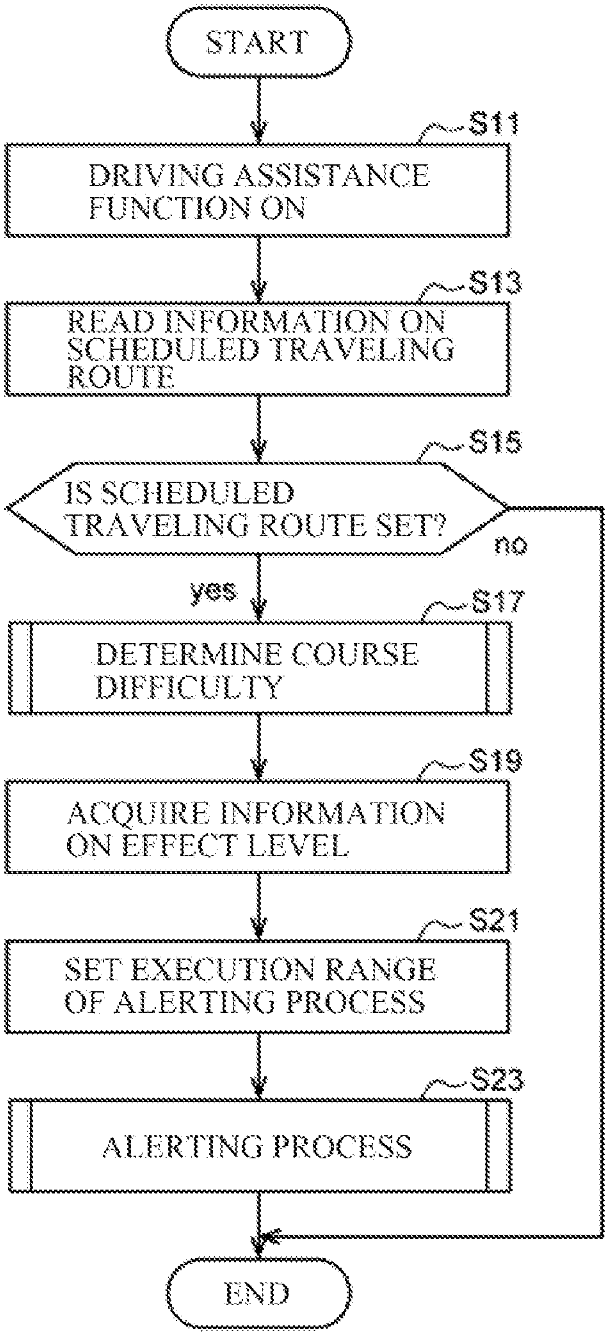

[ FIG. 8 ]
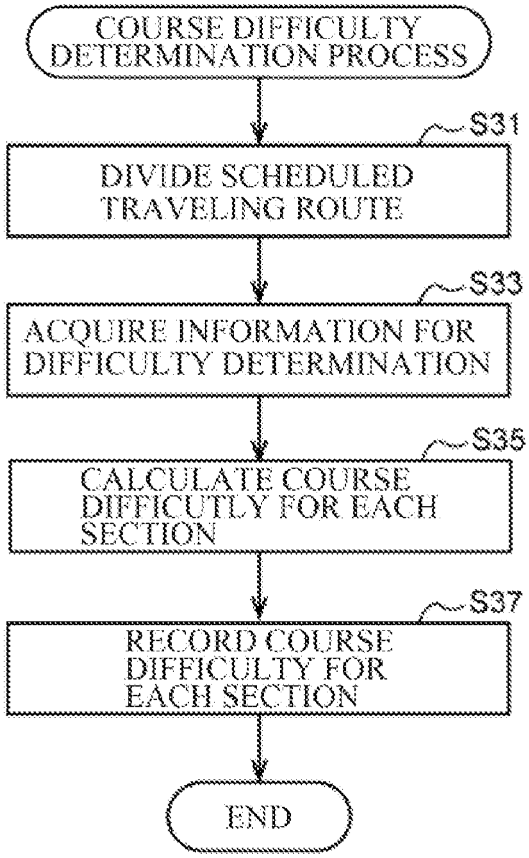

[ FIG. 9 ]
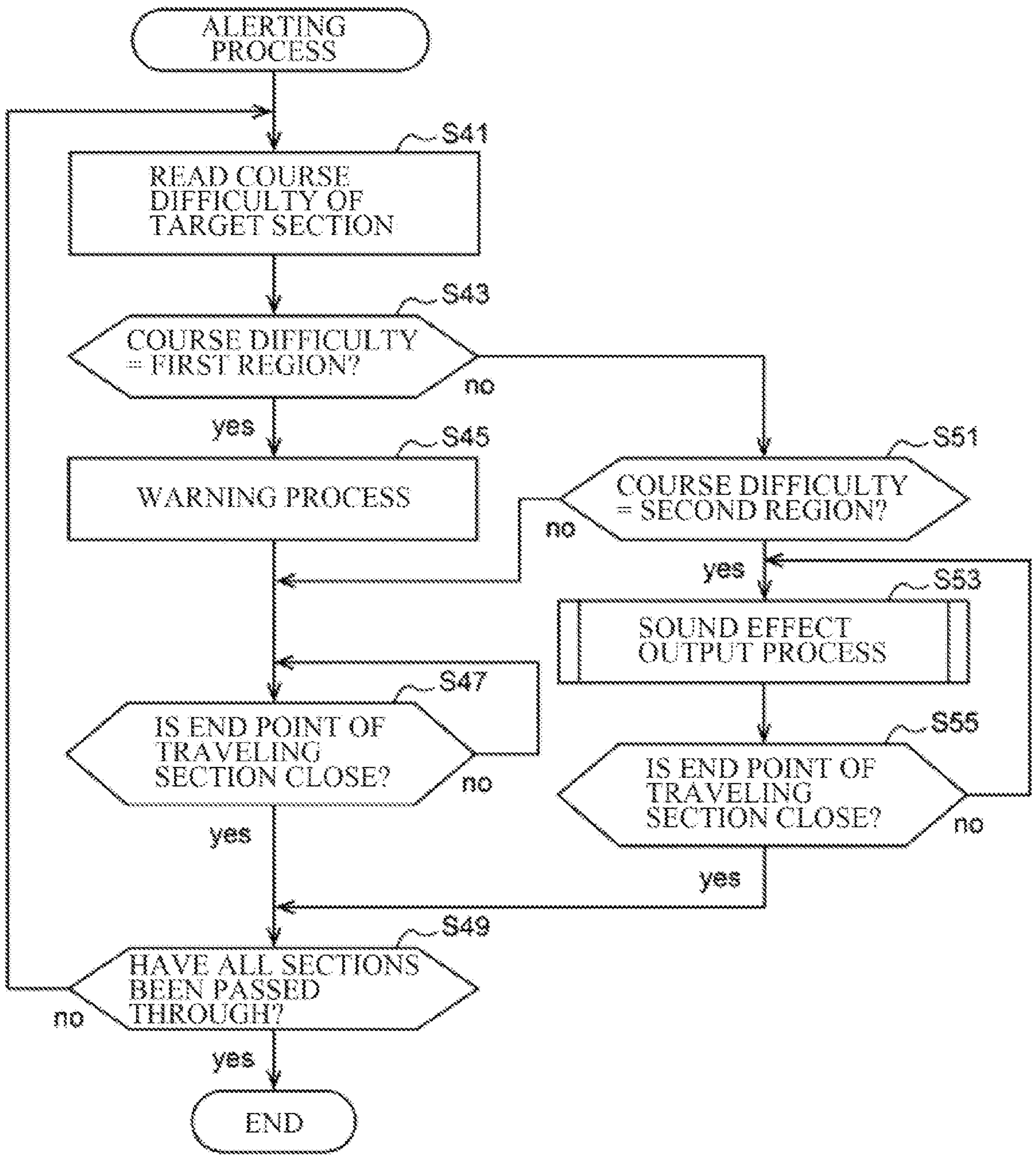

[ FIG. 10 ]
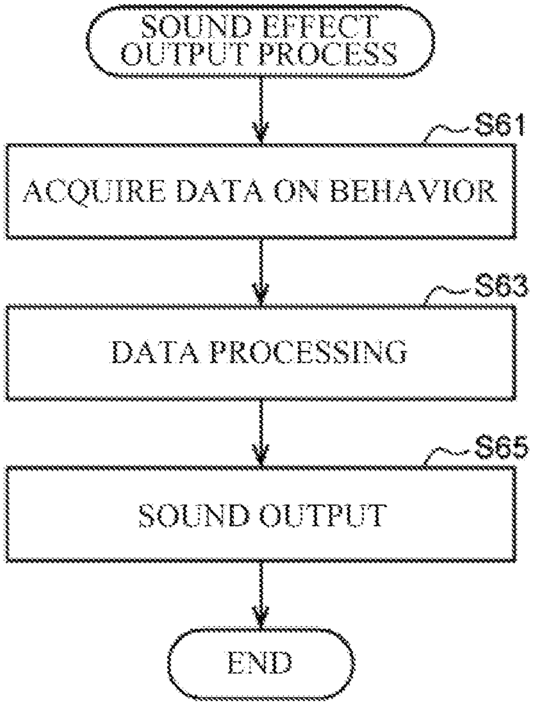

[ FIG. 11 ]
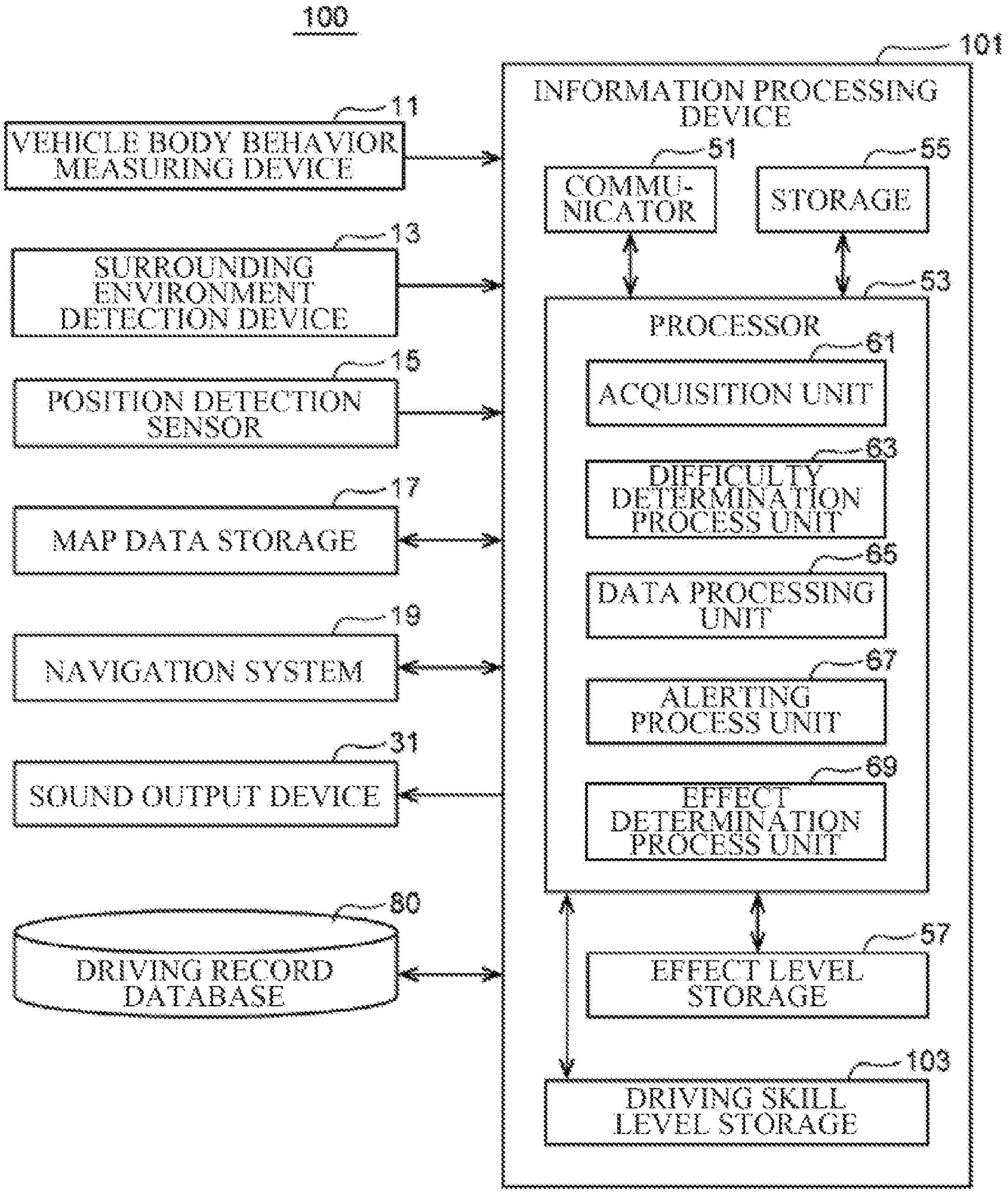

[ FIG. 12 ]

DRIVING SKILL LEVEL 1

EFFECT LEVEL 1

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | | | WARNING | | | | |

SOUND EFECT OUTPUT

EFFECT LEVEL 2

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | SOUND EFECT OUTPUT | | | WARNING | | | |

EFFECT LEVEL 3

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | SOUND EFECT OUTPUT | | | | WARNING | | |

[ FIG. 13 ]

DRIVING SKILL LEVEL 3

EFFECT LEVEL 1

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | | | | | WARNING | | |

SOUND EFECT OUTPUT

EFFECT LEVEL 2

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | | | SOUND EFECT OUTPUT | | | WARNING | |

EFFECT LEVEL 3

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | | | | SOUND EFECT OUTPUT | | | | |

WARNING

[ FIG. 14 ]
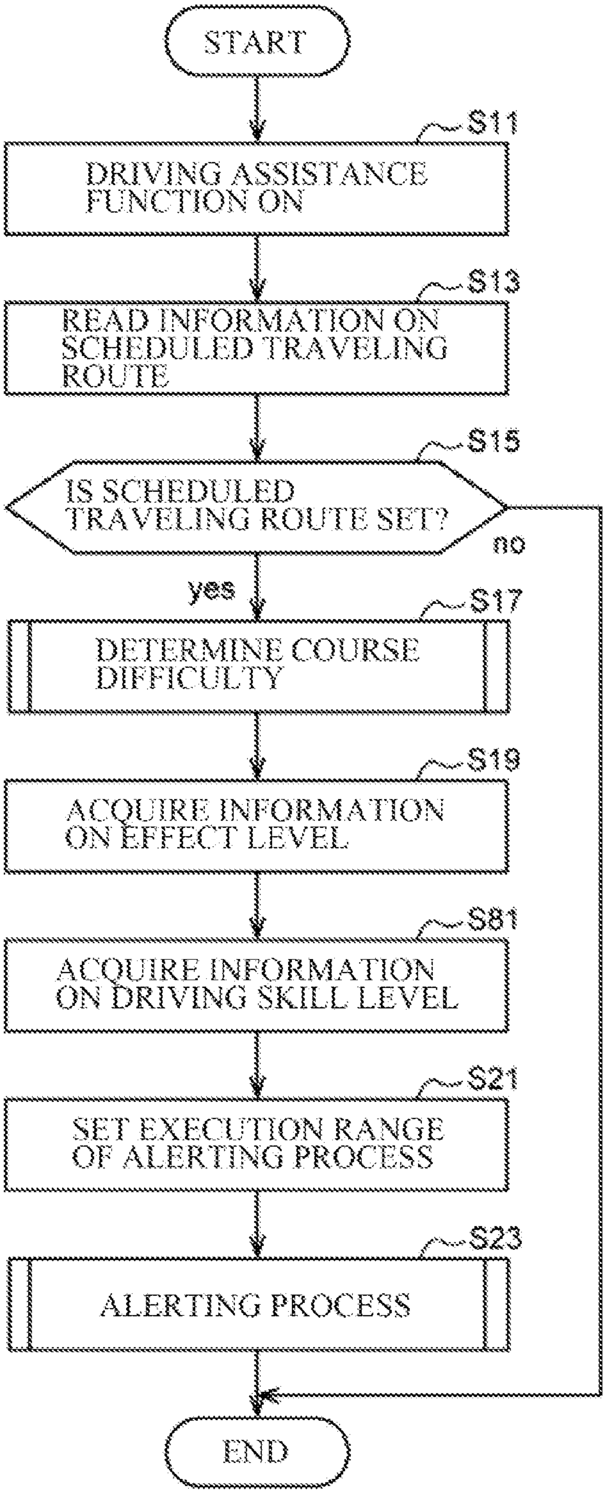

[ FIG. 15 ]
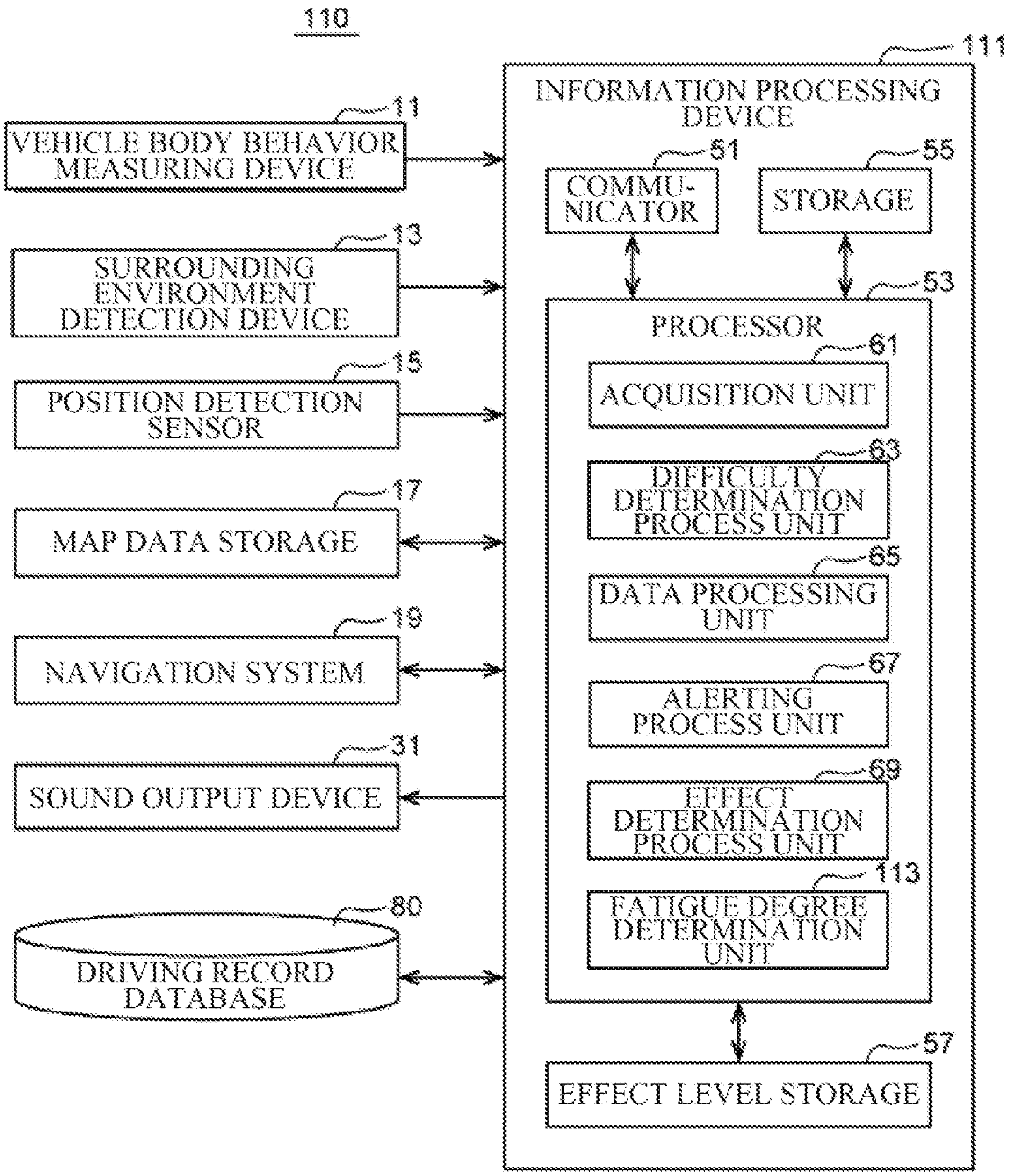

[ FIG. 16 ]

HIGH FATIGUE DEGREE or LOW CONCENTRATION

EFFECT LEVEL 1

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | SOUND EFECT OUTPUT | | | WARNING | | | | |

EFFECT LEVEL 2

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | SOUND EFECT OUTPUT | | | | WARNING | | | |

EFFECT LEVEL 3

| COURSE DIFFICULTY | 1 | 2 | 3 | 4 | 5 | 6 | 7 | 8 | 9 | 10 |
|---|---|---|---|---|---|---|---|---|---|---|
| ALERTING | NO ALERTING | | SOUND EFECT OUTPUT | | | | | WARNING | | |

[ FIG. 17 ]
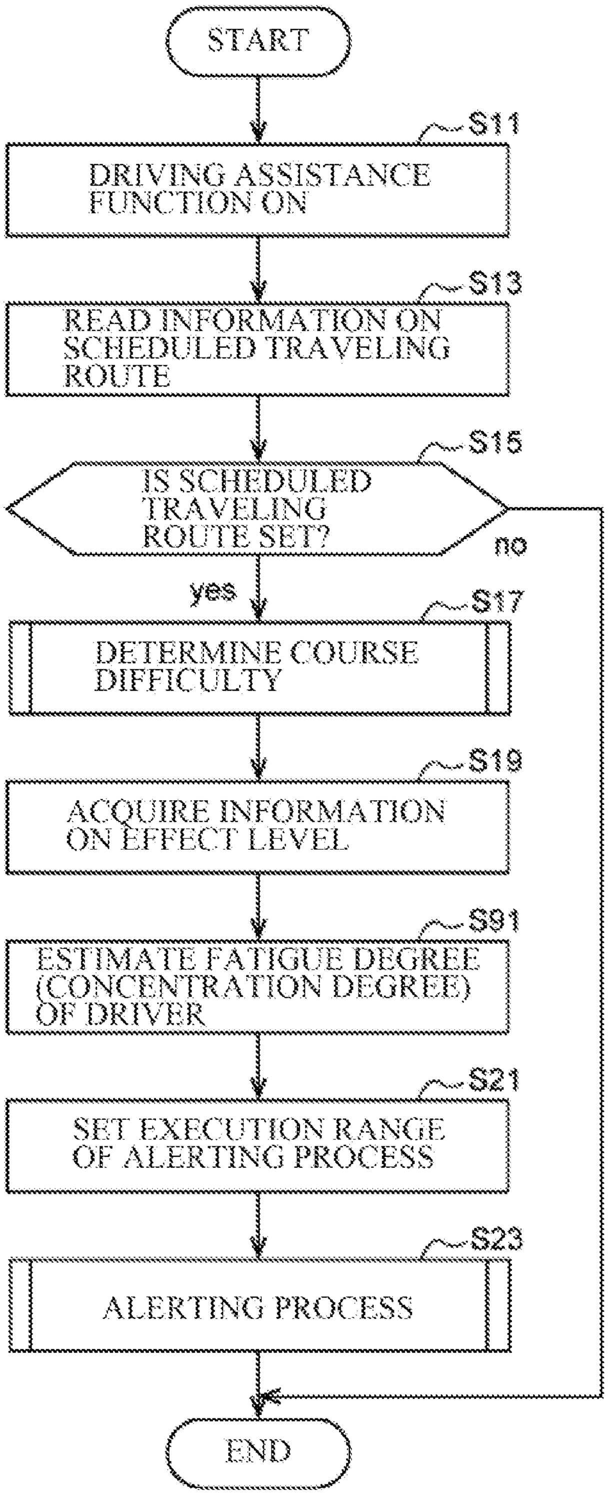

DRIVING ASSISTANCE APPARATUS AND RECORDING MEDIUM

CROSS-REFERENCE TO RELATED APPLICATIONS

This application is the U.S. National Phase under 35 U.S.C. § 371 of International Application No. PCT/JP2022/037454, filed on Oct. 6, 2022.

TECHNICAL FIELD

The disclosure relates to a driving assistance apparatus that assists driving of a vehicle and a recording medium.

BACKGROUND ART

As a navigation apparatus provided in a vehicle, an apparatus is known that notifies a driver in advance of a point to pay attention and alerts the driver. The point to pay attention is, for example, an accident-prone point. For example, Patent Literature 1 discloses a navigation apparatus that acquires a route to a destination of a vehicle; and when a plurality of traffic accident-prone points is present within a distance range preset along the acquired route from a current position of the vehicle, notifies the driver that the vehicle is to travel the traffic accident-prone points. In addition, Patent Literature 2 discloses an alarming information notification system that gives a notification regarding information on a place in which a vehicle is to be carefully driven as alarming information and thereby improves safety and comfort of a user. The place in which the vehicle is to be carefully driven is, for example, a place with a traffic jam, a frozen place, a place into which people tend to run out, or a place with poor visibility.

In addition, disclosed is an apparatus that determines a difficulty of a scheduled traveling route of a vehicle, and notifies a driver of the difficulty in advance. For example, Patent Literature 3 discloses an information providing apparatus that determines a complicated degree of a path in a predetermined section of a route scheduled to travel, and changes a timing to present information on an operation recommended to a driver based on the complicated degree of the section.

CITATION LIST

Patent Literature

Patent Literature 1: Japanese Unexamined Patent Application Publication No. 2006-329713
Patent Literature 2: Japanese Unexamined Patent Application Publication No. 2018-180968
Patent Literature 3: International Publication No. WO2017/141376

SUMMARY OF INVENTION

Problem to be Solved by the Invention

However, systems disclosed in Patent Literatures 1 and 2 simply notify a driver of a point to pay attention, not taking into consideration a situation of the driver who is driving. Therefore, a notification is given also when the notification is unnecessary for some drivers, for example, when the driver has a driving skill of stably traveling the point to pay attention of which the driver has been notified. The driver can think such a notification strange. In addition, an apparatus disclosed in Patent Literature 3 has a function of presenting predetermined information at a timing based on a complicated degree of a route scheduled to travel. However, it is not considered whether the function is effective for the driver.

Regarding the above, when executing a function of alerting a driver who is driving a vehicle, it may be useful to set, for each driver, a situation in which a strong warning is given to the driver and a situation in which a process is executed to guide a driving operation of the driver to be a stable driving operation.

The disclosure is made in view of the above-described problem, and it is an object of the disclosure to provide a driving assistance apparatus and a recording medium that each make it possible to set, for each driver, a situation in which a warning is given as a process of alerting the driver and a situation in which a process of guiding a driving operation of the driver as the process of alerting the driver.

Means for Solving the Problem

To solve the above-described problem, according to an aspect of the disclosure, provided is a driving assistance apparatus configured to execute a process of alerting a driver based on a difficulty of driving. The driving assistance apparatus includes one or more processors, one or more memories communicably coupled to the one or more processors, and an effect level storage in which a degree of an effect is recorded. The effect is an effect of stabilizing a vehicle body behavior while the driver is driving by executing a sound effect output process of outputting a sound effect based on the vehicle body behavior. The one or more processors execute a difficulty determination process of determining the difficulty of driving for each predetermined section in which an own vehicle is scheduled to travel. The one or more processors execute an alerting process of selectively executing the sound effect output process or a warning process based on the difficulty. The warning process is a process of giving a warning to the driver. The one or more processors set respective ranges of the difficulty of driving for executing the sound effect output process and the warning process in the alerting process, based on the degree of the effect of the driver recorded in the effect level storage.

To solve the above-described problem, according to an aspect of the disclosure, provided is a non-transitory tangible recording medium in which a computer program is recorded. The computer program causes one or more processors to execute: a difficulty determination process of determining a difficulty of driving for each predetermined section in which an own vehicle is scheduled to travel; an alerting process of selectively executing a sound effect output process or a warning process based on the difficulty, the sound effect output process being a process of outputting a sound effect based on vehicle body behavior, the warning process being a process of giving a warning to the driver; and a process of setting respective ranges of the difficulty of driving for executing the sound effect output process and the warning process in the alerting process, based on a degree of an effect of stabilizing the vehicle body behavior while the driver is driving by executing the sound effect output process.

Effects of the Invention

As described above, according to the disclosure, it is possible to set, for each driver, a situation in which a warning is given as a process of alerting the driver and a situation in which a process of guiding a driving operation of a driver is executed as the process of alerting the driver.

BRIEF DESCRIPTION OF DRAWINGS

FIG. 1 is a schematic diagram illustrating a configuration example of a vehicle including a driving assistance apparatus according to an embodiment of the disclosure.

FIG. 2 is a block diagram illustrating a configuration example of the driving assistance apparatus according to one embodiment of the disclosure.

FIG. 3 is an explanatory diagram illustrating data processing to be performed by the driving assistance apparatus according to the embodiment.

FIG. 4 is an explanatory diagram illustrating a sound conversion process to be performed by the driving assistance apparatus according to the embodiment.

FIG. 5 is an explanatory diagram illustrating an execution range setting process to be performed by the driving assistance apparatus according to the embodiment.

FIG. 6 is a flowchart illustrating a processing operation of an effect level determination process to be performed by the driving assistance apparatus according to the embodiment.

FIG. 7 is a flowchart illustrating a processing operation of an alerting process to be performed by the driving assistance apparatus according to the embodiment.

FIG. 8 is a flowchart of a process of determining a course difficulty to be performed by the driving assistance apparatus according to the embodiment.

FIG. 9 is a flowchart illustrating a main routine of the alerting process to be performed by the driving assistance apparatus according to the embodiment.

FIG. 10 is a flowchart of a sound effect output process to be performed by the driving assistance apparatus according to the embodiment.

FIG. 11 is a block diagram illustrating a configuration example of a driving assistance apparatus according to a first modification of the embodiment.

FIG. 12 is an explanatory diagram illustrating an execution range setting process to be performed by the driving assistance apparatus according to the first modification of the embodiment.

FIG. 13 is an explanatory diagram illustrating the execution range setting process to be performed by the driving assistance apparatus according to the first modification of the embodiment.

FIG. 14 is a flowchart illustrating a processing operation of an alerting process to be performed by the driving assistance apparatus according to the first modification of the embodiment.

FIG. 15 is a block diagram illustrating a configuration example of a driving assistance apparatus according to a second modification of the embodiment.

FIG. 16 is an explanatory diagram illustrating an execution range setting process to be performed by the driving assistance apparatus according to the second modification of the embodiment.

FIG. 17 is a flowchart illustrating a processing operation of an alerting process to be performed by the driving assistance apparatus according to the second modification of the embodiment.

MODES FOR CARRYING OUT THE INVENTION

In the following, some preferred embodiments of the disclosure are described in detail with reference to the accompanying drawings. Note that throughout the description and the drawings, elements having substantially the same function and configuration are denoted with the same reference numerals to avoid any redundant description.

1. First Embodiment

1-1. Configuration Example of Vehicle

First, a description is provided of an example of an overall configuration of a vehicle to which a driving assistance apparatus according to an embodiment of the disclosure is applicable.

FIG. 1 is a schematic diagram illustrating a configuration example of a vehicle 10 including a driving assistance apparatus 1 according to the embodiment. The vehicle 10 illustrated in FIG. 1 is configured as a four-wheel drive vehicle that transmits driving torque to a left-front wheel 3LF, a right-front wheel 3RF, a left-rear wheel 3LR, and a right-rear wheel 3RR (in the following, collectively referred to as "wheels 3" unless a specific distinction is to be made between them). The driving torque is outputted from a driving force source 9 that generates the driving torque for the vehicle. The driving force source 9 may be an internal combustion engine such as a gasoline engine or a diesel engine, or may be a driving motor. Alternatively, the vehicle 10 may include both the internal combustion engine and the driving motor as the driving force source 9.

Note that the vehicle 10 may be an electric vehicle including two driving motors, e.g., a front wheel driving motor and a rear wheel driving motor, or may be an electric vehicle including driving motors that correspond to the respective wheels 3. Further, when the vehicle 10 is an electric vehicle or a hybrid electric vehicle, the vehicle 10 includes a secondary battery and a generator. The secondary battery accumulates electric power to be supplied to the driving motor. The generator is, for example, a motor or a fuel cell. The generator generates electric power which is used to charge the secondary battery.

The vehicle 10 includes, as devices to be used in a driving control of the vehicle 10, the driving force source 9, an electric steering device 43, and a brake fluid pressure control unit 20. The driving force source 9 outputs the driving torque to be transmitted to a front wheel driving shaft 5F and a rear wheel driving shaft 5R via an unillustrated transmission, a front wheel differential mechanism 7F, and a rear wheel differential mechanism 7R. Driving of the driving force source 9 and the transmission is controlled by a vehicle controller 40 including one or more electronic control units (ECUs).

The electric steering device 43 is provided on the front wheel driving shaft 5F. The electric steering device 43 includes an unillustrated electric motor and an unillustrated gear mechanism. The electric steering device 43 adjusts steering angles of the left-front wheel 3LF and the right-front wheel 3RF. In manual driving, the vehicle controller 40 controls the electric steering device 43 based on a steering angle of a steering wheel 41 set by a driver. Note that the electric steering device 43 may be a hydraulic power steering device.

The vehicle 10 has a brake system configured as a hydraulic brake system. The brake fluid pressure control unit 20 adjusts a hydraulic pressure to be applied to brake calipers 21LF, 21RF, 21LR, and 21RR (in the following, collectively referred to as "brake calipers 21" unless a specific distinction is to be made between them) respectively provided on the left-front driving wheel 3LF, the right-front driving wheel 3RF, the left-rear driving wheel 3LR, and the right-rear driving wheel 3RR to generate braking force. Driving of the brake fluid pressure control unit 20 is controlled by the vehicle controller 40. When the vehicle 10 is an electric vehicle or a hybrid electric vehicle, the brake fluid pressure control unit 20 is used in conjunction with a regenerative brake by the driving motor.

The vehicle controller 40 includes one or more electronic control units that control driving of the driving force source 9, the electric steering device 43, and the brake fluid pressure control unit 20. The driving force source 9 outputs the driving torque for the vehicle 10. The electric steering device 43 controls the steering angle of the steering wheel 41 or a steered wheel. The brake fluid pressure control unit 20 controls the braking force for the vehicle 10. The vehicle controller 40 may have a function of controlling the driving of the transmission that performs shifting of an output from the driving force source 9 and transmits the resultant output to the wheels 3. In manual driving of the vehicle 10, the vehicle controller 40 acquires information on an amount of an operation performed on each of an accelerator pedal, a brake pedal, and the steering wheel by the driver to control the driving of the driving force source 9, the brake fluid pressure control unit 20, and the electric steering device 43.

The driving assistance apparatus 1 includes a vehicle body behavior measuring device 11, a surrounding environment detection device 13 (front imaging cameras 13L ad 13R), a position detection sensor 15, a map data storage 17, a navigation system 19, a sound output device 31, and an information processing device 50. The driving assistance apparatus 1 determines a difficulty of driving of a scheduled traveling route of the vehicle 10, and executes an alerting process. The alerting process is a process of selectively executing a predetermined sound effect output process or a predetermined warning process based on the difficulty. The driving assistance apparatus 1 according to the embodiment is configured to set respective ranges of the difficulty of driving for executing the sound effect output process and the warning process based on a degree of an effect of stabilizing vehicle body behavior while the driver is driving by executing the sound effect output process. This makes it possible to appropriately perform switching between the sound effect output process and the warning process for each driver.

1-2. Configuration of Driving Assistance Apparatus

Next, referring to FIGS. 1 and 2, a specific description is provided of the driving assistance apparatus 1 according to the embodiment. FIG. 2 is a block diagram illustrating an example of a configuration of the driving assistance apparatus 1 according to the embodiment.

The driving assistance apparatus 1 includes the vehicle body behavior measuring device 11, the surrounding environment detection device 13, the position detection sensor 15, the map data storage 17, the navigation system 19, the sound output device 31, and the information processing device 50. The vehicle body behavior measuring device 11, the surrounding environment detection device 13, the position detection sensor 15, the map data storage 17, the navigation system 19, and the sound output device 31 are communicably coupled to the information processing device 50 via a dedicated line, or a communication means such as a CAN (Controller Area Network). The information processing device 50 is also communicably coupled to a driving record database 80.

For example, the information processing device 50 includes one or more processors and one or more storage devices (one or more memories) communicably coupled to the one or more processors. Examples of the processor include a CPU (Central Processing Unit). Examples of the storage device (the memory) include a RAM (Random Access Memory) and a ROM (Read Only Memory). A portion or all of the information processing device 50 may include an updatable device such as firmware, or may be, for example, a program module to be executed based on a command from a device such as a CPU.

The information processing device 50 functions as a device that executes a process of alerting the driver of the vehicle 10 by one or more processors executing a computer program. The computer program is a computer program adapted to causing the one or more processors to execute an operation, which will be described later. The operation is an operation to be executed by the information processing device 50. The computer program to be executed by the one or more processors may be recorded in a recording medium that is provided for the information processing device 50 and serves as a storage (a memory) 55, and may be recorded in the recording medium built in the information processing device 50 or any recording medium externally attachable to the information processing device 50.

The recording medium in which the computer program is recorded may be a magnetic medium such as a hard disk, a floppy disk, or a magnetic tape; an optical recording medium such as a CD-ROM (Compact Disk Read Only Memory), a DVD (Digital Versatile Disk), or a Blu-ray (registered trademark); a magnetic-optical medium such as a floptical disk; a storage device such as a RAM or a ROM; a flash memory such as a USB (Universal Serial Bus) memory or a SSD (Solid State Drive); or any other medium that is configured to contain a program.

Note that the information processing device 50 may include a control device (ECU: Electronic Control Unit) mounted in the vehicle 10, or may include a portable terminal such as a smartphone.

(1-2-1. Vehicle Body Behavior Measuring Device)

The vehicle body behavior measuring device 11 measures a state value indicating vehicle body behavior. The vehicle body behavior measuring device 11 includes, for example, one or more of a vehicle speed sensor, an acceleration sensor, and an angular velocity sensor. The vehicle speed sensor detects, for example, a rotational speed of the driving shaft of the vehicle 10. The acceleration sensor detects at least a longitudinal acceleration rate and a lateral acceleration rate. The longitudinal acceleration rate is an acceleration rate in a vehicle body front-rear direction. The lateral acceleration rate is an acceleration rate in a vehicle width direction. The acceleration sensor may further detect a vertical acceleration rate that is an acceleration rate in a vehicle body height direction. The angular velocity sensor detects a change speed of each of a rotation angle (a roll angle) about an axis in the vehicle body front-rear direction, a rotation angle (a pitch angle) about an axis in the vehicle width direction, and a rotation angle (a yaw angle) about an axis in the vehicle body height direction. The angular velocity sensor may be a yaw rate sensor that detects a change speed of the yaw angle.

The state value measured by the vehicle body behavior measuring device 11 is a state value that may be changed by an operation performed by the driver on the accelerator pedal, the brake pedal, and the steering wheel, and is transmitted to the information processing device 50 as data indicating the vehicle body behavior. The information processing device 50 is configured to acquire data indicating the state value measured by the vehicle body behavior measuring device 11. The vehicle body behavior measuring device 11 may include a sensor configured to measure a state value reflecting the vehicle body behavior, other than the vehicle speed sensor, the acceleration sensor, and the angular velocity sensor.

(1-2-2. Surrounding Environment Detection Device)

The surrounding environment detection device 13 detects information on a surrounding environment of the vehicle 10. The surrounding environment detection device 13 includes, for example, one or more of a stereo camera, a monocular camera, an ultrasonic sensor, a LiDAR (Light Detection and Ranging/Laser Imaging Detection and Ranging), and a radar sensor. The vehicle 10 illustrated in FIG. 1 as an example includes a pair of left and right front imaging cameras 13L and 13R as the surrounding environment detection device 13.

The surrounding environment detection device 13 detects objects around the vehicle 10 based on measured data, and calculates distances to the objects, relative positions of the objects, and relative speeds of the objects. Examples of the objects around the vehicle 10 include another vehicle, a bicycle, a pedestrian, a road sign, and any other obstacle. In addition, the surrounding environment detection device 13 detects information on a region around the vehicle 10, such as a road width, based on the measured data. The information on the surrounding environment detected by the surrounding environment detection device 13 is transmitted to the information processing device 50. The information processing device 50 is configured to acquire information detected by the surrounding environment detection device 13. The surrounding environment detection device 13 may include a sensor configured to detect information on the surrounding environment of the vehicle 10, other than the stereo camera, the monocular camera, the ultrasonic sensor, the LiDAR, and the radar sensor.

(1-2-3. Position Detection Sensor)

The position detection sensor 15 receives a positioning signal transmitted from a satellite of a GNSS (Global Navigation Satellite System) typified by a GPS (Global Positioning System), and detects a position of the vehicle 10. The position of the vehicle 10 is acquired, for example, as data on a latitude and a longitude on the Earth. Instead of the GNSS or in conjunction with the GNSS, the position detection sensor 15 may receive a positioning signal transmitted from another system such as a quasi-zenith satellite system to detect the position of the vehicle 10. The information on the position of the vehicle 10 detected by the position detection sensor 15 is transmitted to the information processing device 50. The information processing device 50 is configured to acquire the information (position information) on the position of the vehicle 10 detected by the position detection sensor 15, and to identify the position of the vehicle 10 on map data.

(1-2-4. Map Data Storage)

The map data storage 17 is a storage device that contains the map data. The map data includes all kinds of information related to traffic, which includes not only information such as terrain, a road type, a road shape, a building, a traffic signal installation position, or a crosswalk, but also a road width, a road slope, the number of traveling lanes, a speed limit, and a traffic control sign. The various kinds of information included in the map data are, for example, associated with position coordinates of a latitude and a longitude on the Earth. Note that the map data storage 17 may be one function of the storage 55 built in the information processing device 50, or may be implemented by an in-vehicle storage device or an external server communicably coupled to the information processing device 50.

(1-2-5. Navigation System)

The navigation system 19 guides a traveling route for the driver in accordance with a setting of the traveling route to a destination. In addition, the navigation system 19 may notify the driver of traffic information such as traffic jam information or road regulation information.

(1-2-6. Sound Output Device)

The sound output device 31 outputs a sound recognizable by the driver. The sound output device 31 may be a speaker of an audio system provided in the vehicle 10, or may be a speaker dedicated to the driving assistance apparatus 1. The sound output device 31 outputs a warning or a sound effect adapted to alerting the driver in accordance with the warning process or the sound effect output process performed by the information processing device 50. The sound output device 31 of the vehicle 10 illustrated in FIG. 1 includes four speakers 31LF, 31RF, 31LR, and 31RR provided on the left-front, the right-front, the left-rear, and the right-rear sides of the vehicle 10.

(1-2-7. Driving Record Database)

The driving record database 80 is a database in which pieces of data on the vehicle body behavior measured during driving by various drivers are recorded. The data on the vehicle body behavior is data on the vehicle body behavior measured while various drivers are driving the vehicle, and is stored in association with the position information related to the vehicle. Examples of the position information related to the vehicle include a traveling point and a traveling route. The data on the vehicle body behavior may be, for example, an index value indicating the vehicle body behavior obtained by a calculation performed by a data processing unit 65 which will be described later. However, the data on the vehicle body behavior is not particularly limited, as long as the data on the vehicle body behavior is data reflecting the vehicle body behavior.

The driving record database 80 may be a non-updatable database in which many pieces of data collected in advance are recorded. Alternatively, the driving record database 80 may be a database that is provided in an external server to which the information processing device 50 is accessibly coupled via a mobile body communication means, and is updatable by data transmitted from each vehicle in a timely manner.

(1-2-8. Information Processing Device)

The information processing device 50 includes a communicator 51, a processor 53, a storage 55, and an effect level storage 57. The processor 53 includes an acquisition unit 61, a difficulty determination process unit 63, the data processing unit 65, an alerting process unit 67, and an effect determination process unit 69. The processor 53 includes a processor such as a CPU. Each of the acquisition unit 61, the difficulty determination process unit 63, the data processing unit 65, the alerting process unit 67, and the effect determination process unit 69 is a function implemented by execution of a program by the processor. Note that a portion of the processor 53 may include an analogue circuit.

(1-2-8-1. Storage)

The storage (the memory) 55 includes one or more storage devices communicably coupled to the processor 53. Examples of the storage device include a RAM and a ROM. The storage 55 contains, for example, a program to be executed by the processor 53 and various parameters to be used in executing the program, and also contains, for example, acquired data and data on a calculation result.

(1-2-8-2. Communicator)

The communicator 51 is an interface adapted to transmission and reception of data or a signal between the processor 53 and each of the vehicle body behavior measuring device 11, the surrounding environment detection device 13, the position detection sensor 15, the map data storage 17, the sound output device 31, and the driving record database 80. In addition, when the map data storage 17 or the driving record database 80 is provided, for example, in an external server, or when the information processing device 50 communicates with an external service such as a telematics service, the communicator 51 includes an interface adapted to communication with, for example, the external server, for example, via a radio communication means.

(1-2-8-3. Effect Level Storage)

The effect level storage 57 contains a degree (an effect level) of an effect of stabilizing the vehicle body behavior while the driver is driving by the alerting process unit 67 executing the sound effect output process. The alerting process unit 67 will be described later. The effect level of the sound effect output process is recorded as information associated with each driver. In the embodiment, the effect level is evaluated in three levels, i.e., level 1 to level 3. Note that the larger number of the effect level represents a greater effect of stabilizing the vehicle body behavior by the sound effect output process. A method of evaluating the effect level will be described later. The effect level storage 57 may include a storage device such as a RAM built in the information processing device 50. However, the effect level storage 57 may include an in-vehicle storage device or an external server communicably coupled to the information processing device 50.

(1-2-8-4. Acquisition Unit)

The acquisition unit 61 of the processor 53 acquires information transmitted from the vehicle body behavior measuring device 11, the surrounding environment detection device 13, and the position detection sensor 15 via the communicator 51. The information to be acquired by the acquisition unit 61 includes data indicating the vehicle body behavior transmitted from the vehicle body behavior measuring device 11. The acquisition unit 61 acquires information at a predetermined sampling cycle.

(1-2-8-5. Difficulty Determination Process Unit)

The difficulty determination process unit 63 determines the difficulty of driving for each predetermined section in which an own vehicle is scheduled to travel. Specifically, the difficulty determination process unit 63 acquires information on a set scheduled traveling route from the navigation system 19, and divides the scheduled traveling route into predetermined sections. In addition, the difficulty determination process unit 63 determines the difficulty of driving for each of the predetermined sections.

A reference for dividing the scheduled traveling route may be set in advance based on any reference. For example, the predetermined section may be a section resulting from dividing the scheduled traveling route on a certain distance basis, may be a section resulting from dividing the scheduled traveling route on a certain estimated traveling time basis, or may be a section resulting from dividing the scheduled traveling route to allow the section to include a certain number of curves having a predetermined radius of curvature or greater. Alternatively, the predetermined section may be a section resulting from dividing the scheduled traveling route from a start point of navigation to the destination into a predetermined number of sections set in advance. Alternatively, the predetermined section may be a section resulting from dividing the scheduled traveling route based on road types. Examples of the road types include an expressway, an urban region, a winding road, and an unpaved road.

The difficulty determination process unit 63 determines the difficulty of driving based on a predetermined reference for each of the predetermined sections of the scheduled traveling route. The difficulty of driving may be determined in accordance with any of various publicly known determination methods that have been proposed. In the embodiment, the difficulty determination process unit 63 calculates a difficulty evaluation value D of driving in each section by the following Expression (1), based on the data on the vehicle body behavior recorded in the driving record database 80, information on the estimated traveling environment, and information on a feature (a specification or a setting) of the vehicle 10.

$$D = a \times Sd + b \times Ed + c \times Cd \tag{1}$$

D: difficulty evaluation value

Sd: first difficulty estimated from driving record database

Ed: second difficulty estimated from traveling environment

Cd: third difficulty estimated from vehicle feature a, b, and c: coefficients

The first difficulty Sd estimated from the driving record database is set based on the data on the vehicle body behavior associated with each section among the pieces of the data on the vehicle body behavior recorded in the driving record database 80. For example, the difficulty determination process unit 63 sets, to the first difficulty Sd, an average value of magnitudes of the vehicle body behavior calculated based on the data on the vehicle body behavior associated with the section of interest. When the data on the vehicle body behavior includes a plurality of kinds of data, the difficulty determination process unit 63 makes the respective pieces of data indicating the vehicle body behavior the same as each other in measure to obtain the average value of the magnitudes of the vehicle body behavior. The first difficulty increases in accordance with an increase in magnitude of the vehicle body behavior during traveling in each section.

The second difficulty Ed estimated from the traveling environment is set based on one or more pieces of information among a radius of curvature of a curve, a road width, an uneven condition of a road, the number of accidents in the past, a congestion state of a road, a construction state, the weather, and an appearance frequency of animals in each section. The difficulty determination process unit 63 is configured to read information on the radius of curvature of the curve and information on the road width from the information stored in the map data storage 17. In addition, the difficulty determination process unit 63 is configured to acquire information on the uneven condition of the road, the number of accidents in the past, the congestion state of the road, the construction state, the weather, and the appearance frequency of animals from an external service system such as a telematics service or a road traffic information system. The difficulty determination process unit 63 integrates the difficulty determination values, based on the acquired information and set the result to the second difficulty Ed. The difficulty determination value is set in advance.

Note that the difficulty determination process unit 63 may acquire information that may influence the difficulty of driving of the vehicle 10 by the driver other than the above-described information, may integrate the difficulty determination values based on the acquired information, and may set the result to the second difficulty Ed.

The third difficulty Cd estimated from the vehicle feature is set based on a specification of equipment that may influence the difficulty of driving of the vehicle 10. For example, the difficulty determination process unit 63 acquires one or more pieces of information among a size, a kind (a sport type), and a setting (a specification of a suspension or a kind of tires) of the vehicle 10 recorded in advance in the storage 55; and sets the third difficulty Cd based on a reference set in advance. The difficulty determination process unit 63 may acquire information such as a load amount of the vehicle 10, the number of occupants, or how easily the occupants get carsick; may integrate the difficulty determination value based on the acquired information; and may set the resultant to the third difficulty Cd.

The difficulty determination process unit 63 is configured to estimate the load amount of the vehicle 10 based on, for example, a suspension stroke amount detected by a stroke sensor. In addition, the difficulty determination process unit 63 is configured to detect the number of occupants based on image data of an in-vehicle imaging camera. The difficulty determination process unit 63 is also configured to detect the number of occupants based on a sensor signal of an occupant detection sensor provided in seats. The difficulty determination process unit 63 is configured to determine, for example, how easily the occupants get carsick, based on information inputted in advance by the occupants or a change in physical conditions of the occupants estimated based on the image data of the in-vehicle imaging camera.

The coefficients a, b, and c are set to appropriate values to cause the respective measures of the first difficulty Sd, the second difficulty Ed, and the third difficulty Cd to match each other. The coefficients a, b, and c may be values reflecting the respective weights of the first difficulty Sd, the second difficulty Ed, and the third difficulty Cd.

The difficulty determination process unit 63 calculates difficulty evaluation values D1, D2, . . . , Dn for sections Sec1, Sec2, . . . , Secn, respectively, into which the scheduled traveling route is divided. In the embodiment, the difficulty determination process unit 63 determines which level of course difficulty the calculated difficulty evaluation value D falls in, and determines the course difficulty (level 1 to level 10). Ten levels are set in advance as the course difficulty. Note that the greater number of the level of the course difficulty represents a higher difficulty of driving.

(1-2-8-6. Data Processing Unit)

The data processing unit 65 of the processor 53 executes predetermined data processing on the data indicating the vehicle body behavior acquired by the acquisition unit 61. Specifically, the data processing unit 65 executes one or more of a smoothing process, an absolute value conversion process, and a differential process on measured data indicating the vehicle body behavior, and calculates the index value that is a value indicating the magnitude of the vehicle body behavior. The measured data indicating the vehicle body behavior is data on the vehicle speed, the acceleration rate (the longitudinal acceleration rate, the lateral acceleration rate, or the vertical acceleration rate), or the angular velocity (the angular velocity of the yaw angle, the roll angle, or the pitch angle). The index value calculated by the data processing unit 65 increases in accordance with an increase in magnitude of the vehicle body behavior. In contrast, the index value calculated by the data processing unit 65 decreases in accordance with a decrease in magnitude of the vehicle body behavior.

For example, the data processing unit 65 executes the smoothing process, the absolute value conversion process, and the differential process on the measured data on the vehicle speed, the acceleration rate, or the angular velocity, and calculates an absolute value of the acceleration rate, a jerk of the absolute value of the acceleration rate, or a jerk (an angular acceleration rate) of an absolute value of the angular velocity. The data processing unit 65 may use, as it is, the calculated absolute value of the acceleration rate, the angular velocity, the jerk, or the angular acceleration rate as the index value. In particular, using the absolute value of the jerk or the angular acceleration rate as the index value reduces an influence of a change in the vehicle speed, the acceleration rate, or the angular velocity due to an influence of a trajectory of the traveling route or acceleration and deceleration of another vehicle. This makes it possible to more accurately evaluate a change in the vehicle body behavior caused by the driving operation performed by the driver.

In addition, the data processing unit 65 may calculate one index value using any plurality of pieces of data among the absolute values of the acceleration rate, the angular velocity, the jerk, and the angular acceleration rate. In this case, the data processing unit 65 may replace the values of the respective pieces of data to be used with the same index (for example, a value of 0 to 100), and may use, as the index value, an average value of the values resulting from replacing the values of all pieces of data to be used with the same index.

Note that the data processing unit 65 is configured to calculate the acceleration rate and the jerk individually for each of one or more of the longitudinal acceleration rate, the lateral acceleration rate, and the vertical acceleration rate. In addition, the data processing unit 65 is configured to calculate the angular velocity and the angular acceleration rate individually for each of one or more of the yaw angle, the roll angle, and the pitch angle.

(1-2-8-7. Alerting Process Unit)

The alerting process unit 67 of the processor 53 selectively executes the sound effect output process or the warning process for each of the sections, based on the course difficulty calculated by the difficulty determination process unit 63. The sound effect output process is a process of outputting a sound effect based on the vehicle body behavior when the vehicle travels in the section of interest. From the sound effect output process, an effect is expectable of prompting the driver to perform a driving operation allowing for highly stable vehicle body behavior. The warning process is a process adapted to notifying the driver that the difficulty of driving in traveling the section of interest is high. From the warning process, an effect is expectable of directly alerting the driver. On this occasion, the alerting process unit 67 sets respective ranges of the course difficulty for executing the sound effect output process and the warning process based on the effect level of the driver recorded in the effect level storage 57.

In the following, a description will be provided of each of an example of the warning process and an example of the sound effect output process, and thereafter, a description will be provided of an execution range setting process of setting the respective ranges of the course difficulty for executing the sound effect output process and the warning process.

(Warning Process)

The warning process is a process of notifying, before passing the section, the driver that the difficulty of driving is high in traveling the section. The alerting process unit 67 causes the sound output device 31 to output a warning sound or a voice a predetermined distance or a predetermined time before the vehicle 10 reaches the section of interest, based on the position information related to the vehicle 10. When causing the voice to be outputted, the alerting process unit 67 may notify the driver of information on specific assumed danger, based on the information used in the calculation of the course difficulty by the difficulty determination process unit 63. Further, in addition to causing the sound output device 31 to output the warning sound or the voice, the alerting process unit 67 may display a warning on a display. Examples of the display include an instrument panel, an image display panel of a navigational device, and an HMI (Human Machine Interface). Note that specific contents of the warning process are not particularly limited.

(Sound Effect Output Process)

The sound effect output process is a process of outputting a sound effect based on the vehicle body behavior while the driver is driving. The alerting process unit 67 notifies the driver of a state of the vehicle body resulting from the driver's own driving, based on the index value of the vehicle body behavior calculated by the data processing unit 65. This allows the driver to pay attention to his or her driving to stabilize the vehicle body behavior. The sound effect output process is not particularly limited in specific outputting method, as long as the sound effect output process is a process of outputting the sound effect based on the vehicle body behavior.

For example, the alerting process unit 67 may execute a process of continuously outputting sounds while changing the output sound in accordance with the magnitude of the vehicle body behavior while the vehicle 10 is traveling. Specifically, the alerting process unit 67 may convert the index value calculated by the data processing unit 65 into information on an output sound whose pitch changes in accordance with the magnitude of the index value, and may control the driving of the sound output device 31 based on the information on the output sound to thereby generate the output sound. This allows the driver to pay attention to the driving operation to keep the output sound at low pitch, and thus guides the driver to achieve the driving operation state allowing for stabilized vehicle body behavior. Accordingly, it is possible for the driver to achieve safety driving of the vehicle 10. Note that the alerting process unit 67 may change the frequency, the volume, the tempo, the number of the tones, or the type of the tone of the output sound, instead of or in addition to changing the pitch of the output sound in accordance with the magnitude of the vehicle body behavior.

Referring to FIGS. 3 and 4, an example of the sound effect output process will be described below. FIGS. 3 and 4 illustrate an example of setting and outputting pitch of a piano sound to be outputted, using, as the index value, a value of a lateral jerk obtained from measured data on the lateral acceleration rate detected by the acceleration sensor serving as one of the vehicle body behavior measuring device 11. As illustrated in FIG. 3, the data processing unit 65 executes a smoothing process and an absolute value conversion process on the measured data on the lateral acceleration rate, and converts the measured data on the lateral acceleration rate into data on the absolute value of the lateral acceleration rate. Further, the data processing unit 65 executes a time differential process on the data on the absolute value of the lateral acceleration rate, and converts the data on the absolute value of the lateral acceleration rate into data on an absolute value of the lateral jerk.

As illustrated in FIG. 4, the alerting process unit 67 sets the pitch of the output sound based on the absolute value (the index value) of the lateral jerk. The pitch of the output sound is assigned in advance based on the index value of the lateral jerk. For example, the pitch for a state where the index value is zero is set to the lowest pitch, the pitch for a state where the index value is the upper limit value lim is set to the highest pitch, and the index values between zero and the upper limit value lim are assigned to respective pitches of each scale. The index values at or higher than the upper limit value lim are all assigned to the highest pitch. The sound of the pitch based on the index value reflecting the vehicle body behavior is thus outputted. This allows the driver to recognize a change in the vehicle body behavior as a change in sound, and makes it possible for the driver to recognize the vehicle body behavior resulting from his or her driving operation while the vehicle is traveling, on a real-time basis and in a way that allows for suppression of a decline in attention. It is therefore possible for the driver to pay attention to his or her driving to stabilize the vehicle body behavior.

Note that the sound effect output process is not limited to the above-described example. For example, the alerting process unit 67 may increase the volume of a comfortable sound effect, a music, or a music reproduction sound in accordance with a decrease in the index value reflecting the vehicle body behavior. Such a sound effect output process also makes it possible for the driver to pay attention to his or her own driving to make the comfortable sound effect or the like more easily heard.

(Execution Range Setting Process)

The execution range setting process is a process of setting the respective ranges of the course difficulty for executing the sound effect output process and the warning process, based on the effect level of the driver recorded in the effect level storage 57. In the embodiment, the course difficulty of each section is set to any of level 1 to level 10 based on the difficulty evaluation value D. The alerting process unit 67 sets, based on the effect level of the driver, the level for executing the sound effect output process and the level for executing the warning process among level 1 to level 10 to which the course difficulty is set.

FIG. 5 is an explanatory diagram illustrating an example of the respective ranges of the course difficulty for executing the sound effect output process and the warning process that are set by the execution range setting process. As illustrated in FIG. 5, the alerting process unit 67 classifies the course difficulty into three regions, and sets the warning process to be executed for a first region that is highest in the course difficulty. In addition, the alerting process unit 67 sets neither the warning process nor the sound effect output process to be executed for a third region that is lowest in the course difficulty. In addition, the alerting process unit 67 sets the sound effect output process to be executed for a second region between the first region and the third region.

Specifically, when the effect level of the driver related to the sound effect output process is effect level 2, the alerting process unit 67 sets the sound effect output process to be executed in a section where the course difficulty is any of level 5 to level 7. In addition, the alerting process unit 67 sets the warning process to be executed in a section where the course difficulty is any of level 8 to level 10. In addition, the alerting process unit 67 sets neither the sound effect output process nor the warning process to be executed in a section where the course difficulty is any of level 1 to level 4.

Further, when the effect level of the driver related to the sound effect output process is effect level 1, the alerting process unit 67 reduces the execution range of the sound effect output process that is low in effect, and sets the sound effect output process to be executed in a section where the course difficulty is any of level 5 and level 6. In addition, the alerting process unit 67 sets the warning process to be executed in a section where the course difficulty is any of level 7 to level 10. In addition, the alerting process unit 67 sets neither the sound effect output process nor the warning process to be executed in a section where the course difficulty is any of level 1 to level 4.

Further, when the effect level of the driver related to the sound effect output process is effect level 3, the alerting process unit 67 expands the execution range of the sound effect output process that is high in effect, and sets the sound effect output process to be executed in a section where the course difficulty is any of level 5 to level 8. In addition, the alerting process unit 67 sets the warning process to be executed in a section where the course difficulty is any of level 9 and level 10. In addition, the alerting process unit 67 sets neither the sound effect output process nor the warning process to be executed in a section where the course difficulty is any of level 1 to level 4.

In the example illustrated in FIG. 5, the alerting process unit 67 changes the range (the second region) of the level of the course difficulty for executing the sound effect output process and the range (the first region) of the level of the course difficulty for executing the warning process based on the effect level of the driver, while maintaining the range (the third region) of the level of the course difficulty for which neither the sound effect output process nor the warning process is set to be executed. This increases the number of opportunities to execute the sound effect output process for the driver for whom the effect of stabilizing the vehicle body behavior by the sound effect output process is high, and makes it possible to guide the driving operation performed by the driver to a driving operation stabilizing the vehicle body behavior, rather than simply giving a warning. In contrast, for the driver for whom the effect of stabilizing the vehicle body behavior by the sound effect output process is low, the number of opportunities to execute the sound effect output process is reduced and a direct warning is given. This makes it possible to alert the driver.

Note that the number of level classifications of the course difficulty, the method of setting the classifications of the first region, the second region, and the third region, and the method of changing the classifications based on the effect level are not limited to the examples described above.

(1-2-8-8. Effect Determination Process Unit)

The effect determination process unit 69 of the processor 53 determines the degree (the effect level) of the effect of stabilizing the vehicle body behavior resulting from the execution of the sound effect output process performed by the alerting process unit 67.

The effect determination process unit 69 compares the vehicle body behavior in a case where the sound effect output process is executed by the alerting process unit 67 with the vehicle body behavior in a case where no sound effect output process is executed, and determines the degree of the effect based on a predetermined reference.

For example, for each of the case where the sound effect output process is executed and the case where no sound effect output process is executed, the effect determination process unit 69 determines the number of times the index value of the vehicle body behavior calculated by the data processing unit 65 exceeds a predetermined threshold, for each predetermined reference distance or each predetermined reference time. The effect determination process unit 69 calculates an average value of the calculated number of times for each of the case where the sound effect output process is executed and the case where no sound effect output process is executed. Further, the effect determination process unit 69 calculates the effect level based on the number of times or a ratio at which the above-described average value in the case where the sound effect output process is executed becomes lower than the above-described average value in the case where no sound effect output process is executed.

In the embodiment, the effect determination process unit 69 determines the effect level in three levels (effect level 1 to effect level 3), and records a result of the calculation in the effect level storage 57. The greater number of the effect level indicates a higher effect of stabilizing the vehicle body behavior by the sound effect output process. Each time the effect determination process unit 69 newly calculates the effect level, the effect determination process unit 69 reads the history of the effect levels recorded in the effect level storage 57 in the past, determines the average value obtained by also including information on the newly calculated effect level, and updates the information to be recorded in the effect level storage 57. Alternatively, the effect determination process unit 69 may overwrite the information on the effect level recorded in the effect level storage 57 with information on the newly calculated effect level.

Note that the method of calculating the effect level by the effect determination process unit 69 is not limited to the above-described example. Any method may be applied, as long as the method is a method of executing predetermined data processing using data indicating the vehicle body behavior in the case where the sound effect output process is executed and data indicating the vehicle body behavior in the case where no sound effect output processing is executed, and determining the degree of stability of the vehicle body in the case where the sound effect output process is executed.

1-3. Processing Operation

Next, a description will be provided of an example of a processing operation to be performed by the information processing device of the driving assistance apparatus according to the embodiment. In the following, an operation of the effect determination process to be performed by the information processing device 50 and an operation of the alerting process to be performed by the information processing device 50 will be described.

(1-3-1. Effect Determination Process)

FIG. 6 is a flowchart illustrating a processing operation of the effect level determination process to be performed by the effect determination process unit 69.

First, the effect determination process unit 69 reads the data on the vehicle body behavior measured in the case of executing the sound effect output process (step S71). In the embodiment, the effect determination process unit 69 reads the data on the index value reflecting the magnitude of the vehicle body behavior calculated by the data processing unit 65 and recorded in the storage 55.

Thereafter, the effect determination process unit 69 reads the data on the vehicle body behavior measured in the case of not executing the sound effect output process (step S73). In the embodiment, as with in step S71, the effect determination process unit 69 reads the data on the index value reflecting the magnitude of the vehicle body behavior calculated by the data processing unit 65 and recorded in the storage 55.

Thereafter, the effect determination process unit 69 compares the data on the vehicle body behavior in the case of executing the sound effect output process and the data on the vehicle body behavior in the case of not executing the sound effect output process with each other, and determines the degree (the effect level) of the effect of stabilizing the vehicle body behavior by the sound effect output process (step S75). For example, the effect determination process unit 69 calculates the number of times the index value of the vehicle body behavior exceeds the predetermined threshold for each predetermined reference distance or each predetermined reference time. In addition, the effect determination process unit 69 calculates the average value of the calculated numbers of times for each of the case of executing the sound effect output process and the case of not executing the sound effect output process. Further, the effect determination process unit 69 calculates the effect level based on the number of times or a ratio at which the above-described average value in the case of executing the sound effect output process becomes lower than the above-described average value in the case of not executing the sound effect output process.

In the embodiment, the effect determination process unit 69 determines the effect level in three levels (effect level 1 to effect level 3), and records the calculated effect level in the effect level storage 57 together with identification data related to the driver. Note that the method of determining the degree of the effect of stabilizing the vehicle body behavior by the sound effect output process is not limited to the example described above.

Note that the effect determination process unit 69 may execute the effect level determination process at any timing. For example, the effect determination process unit 69 may execute the effect level determination process every time the vehicle 10 passes a section in which the sound effect output process is executed, or may execute the effect level determination process when the vehicle 10 travels along the scheduled traveling route and arrives at the destination. Alternatively, the effect determination process unit 69 may execute the effect level determination process when a switch of the vehicle 10 is turned off.

(1-3-2. Alerting Process)

FIG. 7 is a flowchart illustrating a processing operation of the alerting process to be performed by the information processing device 50. The flowchart illustrated in FIG. 7 may be executed always when the system of the vehicle 10 is started, or may be executed after the user starts the system of the driving assistance apparatus at any timing.

First, when the function of the driving assistance apparatus 1 is turned on (activated) (step S11), the difficulty determination process unit 63 of the processor 53 reads the information on the scheduled traveling route (step S13). Specifically, the difficulty determination process unit 63 refers to the setting information related to the navigation system 19 and reads the information on the scheduled traveling route.

Thereafter, the difficulty determination process unit 63 determines whether the scheduled traveling route is set (step S15). If the difficulty determination process unit 63 determines that the scheduled traveling route is not set (S15/No), this routine is ended and the process returns to the start. In contrast, if the difficulty determination process unit 63 determines that the scheduled traveling route is set (S15/Yes), the difficulty determination process unit 63 determines the course difficulty of the scheduled traveling route (step S17). The difficulty determination process unit 63 divides the scheduled traveling route into predetermined sections, and determines the difficulty of driving for each of the predetermined sections.

FIG. 8 is a flowchart of a process of determining the course difficulty.

First, the difficulty determination process unit 63 divides the scheduled traveling route into the predetermined sections based on a reference set in advance (step S31). For example, the difficulty determination process unit 63 divides the scheduled traveling route on a certain distance basis or on a certain estimated traveling time basis. When the difficulty determination process unit 63 divides the scheduled traveling route on the certain estimated traveling time basis, for example, the difficulty determination process unit 63 divides the scheduled traveling route on a basis of a distance to be traveled when the vehicle travels at a legal speed of a scheduled traveling road for a predetermined reference time.

In addition, the difficulty determination process unit 63 may divide the scheduled traveling route to allow each section to include a certain number of curves having a predetermined radius of curvature or greater, or may divide the scheduled traveling route into a certain number of sections set in advance. Alternatively, the difficulty determination process unit 63 may divide the scheduled traveling route on a basis of a road type. Examples of the road type include an expressway, an urban region, a winding road, and an unpaved road.

Thereafter, the difficulty determination process unit 63 acquires various kinds of information required for determining the course difficulty (step S33). In the embodiment, for each section, the difficulty determination process unit 63 acquires the data on the vehicle body behavior recorded in the driving record database 80, information on an estimated traveling environment, and information on the feature (the specification or the setting) of the vehicle 10.

The data on the vehicle body behavior includes the data on the vehicle body behavior in a case where a plurality of vehicles including the own vehicle have traveled each section in the past. The estimated traveling environment includes one or more pieces of information among a radius of curvature of a curve, a road width, an uneven condition of a road, the number of accidents in the past, a congestion state of the road, a construction state, the weather, and an appearance frequency of animals in each section. The information on the feature of the vehicle 10 is information that may influence the difficulty of driving of the vehicle 10, and includes one or more pieces of information among the size, the kind (a sport type), and the setting (the specification of the suspension or the kind of tires) of the vehicle 10. As the information on the feature of the vehicle 10, the difficulty determination process unit 63 may acquire information such as the load amount of the vehicle 10, the number of occupants, or how easily the occupants get carsick.

Thereafter, the difficulty determination process unit 63 calculates the course difficulty for each section (step S35). In the embodiment, the difficulty determination process unit 63 calculates the difficulty evaluation values D1, D2, . . . , Dn of driving in the respective sections based on the foregoing Expression (1), and determines the level (level 1 to level 10) of the course difficulty based on the difficulty evaluation value D. The greater number of the level of the course difficulty represents a higher difficulty of driving.

Thereafter, the difficulty determination process unit 63 records the course difficulty calculated for each section in the storage 55 (step S37), and ends the process of determining the course difficulty.

Returning to FIG. 7, after the process of determining the course difficulty is completed, the alerting process unit 67 of the processor 53 acquires the information on the effect level of the driver from the effect level storage 57 (step S19). For example, the alerting process unit 67 reads the information on the effect level recorded, in the effect level storage 57, in association with the identification data related to the driver. The identification data related to the driver is information adapted to identifying each driver. For example, the alerting process unit 67 identifies the identification data of the driver of interest based on information inputted by each driver, and reads the relevant information on the effect level. Alternatively, the alerting process unit 67 may identify the identification data related to the driver based on a facial feature quantity of the driver recognized based on image data of the in-vehicle imaging camera, and may read relevant information on the effect level.

Thereafter, the alerting process unit 67 sets the respective ranges of the course difficulty for executing the sound effect output process and the warning process, based on the acquired effect level of the driver (step S21). In the embodiment, the acquired effect level is set to any of effect level 1, effect level 2, and effect level 3, and a setting pattern of the respective ranges of the course difficulty for executing the sound effect output process and the warning process based on the effect level is recorded in the storage 55 in advance. The alerting process unit 67 sets the setting pattern based on the effect level of the driver to the respective ranges of the course difficulty for executing the sound effect output process and the warning process (see FIG. 5). In this manner, the first region of the course difficulty for executing the warning process, the second region of the course difficulty for executing the sound effect output process, and the third region of the course difficulty for executing neither the sound effect output process nor the warning process are set.

Thereafter, while the vehicle 10 is traveling, the alerting process unit 67 executes the alerting process based on the information on the course difficulty of each section and the information on the respective ranges of the course difficulty for executing the sound effect output process and the warning process (step S23).

FIG. 9 is a flowchart illustrating a processing operation to be performed by the alerting process unit 67.

First, the alerting process unit 67 reads the course difficulty of a target section calculated in step S17 described above (step S41). After the driving assistance process is started, if the determination in step S41 is to be performed for the first time, the alerting process unit 67 reads the course difficulty of the first section counted from the start point among the plurality of sections into which the scheduled traveling route is divided. In contrast, if the determination in step S41 is to be performed for the second or subsequent time, the alerting process unit 67 reads the course difficulty of the next section of the section in which the vehicle is currently traveling.

Thereafter, the alerting process unit 67 determines whether the read course difficulty is included in the first region for executing the warning process (step S43). If the alerting process unit 67 determines that the course difficulty is included in the first region (S43/Yes), the alerting process unit 67 executes the warning process in the target section (step S45). For example, when the effect level of the driver is effect level 2 and the course difficulty is any of level 8 to level 10, the alerting process unit 67 determines that the course difficulty is included in the first region and executes the warning process.

Specifically, the alerting process unit 67 causes the sound output device 31 to output the warning sound or the voice a predetermined distance or a predetermined time before the vehicle 10 arrives at the section of interest, based on the position information related to the vehicle 10. When causing the voice to be outputted, the alerting process unit 67 may notify the driver of information on a specific estimated danger, based on the information used in the calculation of the course difficulty performed by the difficulty determination process unit 63. Alternatively, the alerting process unit 67 may notify the driver of information on a specific danger while the vehicle 10 is traveling in the section of interest. Further, in addition to causing the sound output device 31 to output the warning sound or the voice, the alerting process unit 67 may display a warning on the display. Examples of the display include the instrument panel, the image display panel of the navigation device, and the HMI (Human Machine Interface).

With the warning process, it is possible to directly give a warning to the driver and alert the driver. Note that specific contents of the warning process are not particularly limited.

After executing the warning process or while executing the warning process, the alerting process unit 67 determines whether an end point of the section where the vehicle is currently traveling is close (step S47). For example, the alerting process unit 67 determines that the end point is close when a distance to the end point or a time to arrive at the end point becomes less than a predetermined reference value. If the alerting process unit 67 determines that the end point of the section where the vehicle is currently traveling is not close (S47/No), the alerting process unit 67 repeats the determination in step S47. In contrast, if the alerting process unit 67 determines that the end point of the section where the vehicle is currently traveling is close (S47/Yes), the process proceeds to a process of determining whether all the sections of the scheduled traveling route have been passed through (step S49).

In contrast, if the alerting process unit 67 determines that the course difficulty is not included in the first region in step S43 described above (S43/No), the alerting process unit 67 determines whether the read course difficulty is included in the second region for executing the sound effect output process (step S51). If the alerting process unit 67 determines that the course difficulty is not included in the second region (S51/No), the course difficulty is included in the third region. The process proceeds to step S47 and the alerting process unit 67 repeats the above-described determination process. In contrast, if the alerting process unit 67 determines that the course difficulty is included in the second region (S51/Yes), the alerting process unit 67 executes the sound effect output process in the target section (step S53).

FIG. 10 is a flowchart of the sound effect output process.

In the sound effect output process, first, the data processing unit 65 acquires the data indicating the vehicle body behavior outputted from the vehicle body behavior measuring device 11 (step S61). Thereafter, the data processing unit 65 executes predetermined data processing on the acquired data indicating the vehicle body behavior (step S63). For example, the data processing unit 65 executes one or more processes of the smoothing process, the absolute value conversion process, and the differential process on the acquired data, and calculates the index value indicating the magnitude of the vehicle body behavior. More specifically, as illustrated in FIG. 3 as an example, the data processing unit 65 executes the smoothing process and the absolute value conversion process on the measured data on the lateral acceleration rate to convert the measured data on the lateral acceleration rate into data on the absolute value of the lateral acceleration rate. Further, the data processing unit 65 executes the time differential process on the data on the absolute value of the lateral acceleration rate to convert the data on the absolute value of the lateral acceleration rate into data on the absolute value (the index value) of the lateral jerk.

Thereafter, the alerting process unit 67 executes a process of outputting a sound based on the data indicating the vehicle body behavior (step S65). For example, as illustrated in FIG. 4 as an example, the alerting process unit 67 sets the pitch of the output sound based on the index value indicating the magnitude of the vehicle body behavior, and causes the sound output device 31 to output the output sound. The sound having the pitch based on the index value reflecting the vehicle body behavior is thus outputted. This makes it possible to guide the driving operation of the driver to the driving operation stabilizing the vehicle body behavior, rather than simply giving a warning.

Returning to FIG. 9, while executing the sound effect output process in step S53, the alerting process unit 67 determines whether the end point of the section where the vehicle is currently traveling is close, as with in step S47 (step S55). If the alerting process unit 67 determines that the end point of the section where the vehicle is currently traveling is not close (S55/No), the alerting process unit 67 executes the sound effect output process in step S53, and repeats the determination in step S55. In contrast, if the alerting process unit 67 determines that the end point of the section where the vehicle is currently traveling is close (S55/Yes), the process proceeds to a process of determining whether all the sections of the scheduled traveling route have been passed through (step S49).

When the alerting process unit 67 determines that the end point of the section where the vehicle is currently traveling is close (S47/Yes or S55/Yes), the alerting process unit 67 determines whether all the sections of the scheduled traveling route have been passed through (step S49). If the alerting process unit 67 determines that not all the sections of the scheduled traveling route have been passed through (S49/No), the process returns to step S41, and the alerting process unit 67 executes the alerting process for the next section. In contrast, if the alerting process unit 67 determines that all the sections of the scheduled traveling route have been passed through (S49/Yes), the alerting process unit 67 ends the alerting process when the vehicle arrives at the target point of the scheduled traveling route.

1-4. Effects of Embodiment

The driving assistance apparatus 1 according to the embodiment sets the course difficulty for each of the sections into which the scheduled traveling route is divided, and executes the sound effect output process and the warning process based on the course difficulty. On this occasion, the driving assistance apparatus 1 changes the respective ranges of the course difficulty for executing the sound effect output process and the warning process based on the level of the effect of stabilizing the vehicle body behavior by the sound effect output process. This increases the number of opportunities to execute the sound effect output process for the driver for whom the effect of stabilizing the vehicle body behavior by the sound effect output process is high, and makes it possible to guide the driving operation of the driver to a driving operation stabilizing the vehicle body behavior, rather than simply giving a warning. In contrast, for the driver for whom the effect of stabilizing the vehicle body behavior by the sound effect output process is low, the number of opportunities to execute the sound effect output process is reduced to give a direct warning. This makes it possible to alert the driver.

Further, the driving assistance apparatus 1 according to the embodiment classifies the course difficulty into the first region that is highest in the difficulty, the third region that is lowest in the difficulty, and the third region between the first region and the second region. The driving assistance apparatus 1 according to the embodiment executes the warning process for the first region, executes the sound effect output process for the second region, and executes neither the sound effect output process nor the warning process for the third region. Further, the driving assistance apparatus 1 changes the respective ranges of the first region, the second region, and the third region based on the above-described effect level of each driver. Accordingly, a direct warning is given in a situation where the course difficulty is relatively high and it is necessary to be very careful during traveling. In contrast, in a situation where the course difficulty is relatively medium and the effect of the sound effect output process is expectable for each driver, the sound effect output process is executed. Thus, a warning is given not in all situations. This makes it possible to reduce the strangeness felt by the driver and to guide the driving operation of the driver to a driving operation enhancing the stability of the vehicle body behavior.

Moreover, the driving assistance apparatus 1 according to the embodiment, the range of the second region for executing the sound effect output process is expanded while the range of the first region for executing the warning process is reduced in accordance with an increase in the above-described effect level related to the sound effect output process. This makes it possible to increase the number of opportunities of giving priority to the sound effect output process over the warning process and executing the sound effect output process, in accordance with an increase in expectable effect, for the driver, of improving the stability of the vehicle body behavior by the sound effect output process.

2. Other Embodiments

The description has been provided above of the driving assistance apparatus according to the embodiment of the disclosure. The driving assistance apparatus according to the embodiment described above may be variously modified. Described below are some modifications of the driving assistance apparatus according to the embodiment described above.

2-1. First Modification

The driving assistance apparatus according to a first modification is configured to change the respective ranges of the difficulty of driving for executing the sound effect output process and the warning process, based on a driving skill of the driver in conjunction with the degree of the effect of stabilizing the vehicle body behavior by the sound effect output process.

FIG. 11 is a block diagram illustrating a configuration example of a driving assistance apparatus 100 according to the first modification. An information processing device 101 of the driving assistance apparatus 100 includes a driving skill level storage 103 communicably coupled to the processor 53. The driving skill level storage 103 contains information on a driving skill level of each driver together with the identification data related to the driver. In the first modification, the driving skill levels are set to be classified into three levels of level 1 to level 3. The greater number of level represents a higher driving skill.

The method of setting the driving skill level is not particularly limited, and the driving skill determined based on a publicly known method of determining the driving skill may be set to be classified into three levels. As the information adapted to determining the driving skill of the driver, for example, used may be any one or more pieces of information among the age of the driver, years elapsed after acquisition of license, a frequency of driving, years elapsed after the latest driving, etc. For example, when the age of the driver belongs to the elderly, the driving skill level is set to be low because the driving skill is probably low. Further, as the years elapsed after acquisition of license is longer, the driving skill level is set to be higher as it is estimated that the driving skill is higher. Further, as the frequency of driving is higher, the driving skill level is set to be higher because it is estimated that the driving skill is higher. Further, as the years (years of gap) elapsed after the latest driving is longer, the driving skill level is set to be lower because the driving skill is probably lower.

Further, as the information adapted to determining the driving skill of the driver, used may be the data on the index value reflecting the vehicle body behavior during the driving by the same driver in the past. In this case, as the number of times the index value exceeds the upper limit value (see FIG. 4) is smaller or the frequency at which the index value exceeds the upper limit value is lower, the driving skill level is set to be higher because it is estimated that the driving skill is higher. In addition to the above, the driving skill level of the driver may be set based on various kinds of information.

FIG. 12 and FIG. 13 are each an explanatory diagram illustrating an example of the respective ranges of the course difficulty for executing the sound effect output process and the warning process set by the execution range setting process in the first modification, as with FIG. 5. Here, the setting pattern illustrated in FIG. 5 is assumed to be an example describing the setting pattern of the driver whose driving skill level is level 2 for each effect level related to the sound effect output process. The setting pattern illustrated in FIG. 12 is an example of describing the setting pattern of the driver whose driving skill level is level 1 for each effect level related to the sound effect output process. The setting pattern illustrated in FIG. 13 is an example of describing the setting pattern of the driver whose driving skill level is level 3 for each effect level related to the sound effect output process. Note that the greater number of the driving skill level represents a higher driving skill.

When the driver has the driving skill level of level 1, the range of the third region for executing neither the sound effect output process nor the warning process is reduced, as compared with the case where the driver has the driving skill level of level 2. In contrast, when the driver has the driving skill level of level 3, the range of the third region for executing neither the sound effect output process nor the warning process is expanded, as compared with the case where the driver has the driving skill level of level 2. That is, the respective ranges of the course difficulty for executing the sound effect output process and the warning process are expanded more in accordance with a relative decrease in the driving skill level of the driver. This facilitates alerting the driver who has a low driving skill level, which enhances driving safety. In contrast, this helps to suppress alerting the driver who has a high driving skill level when the course difficulty is low. It is therefore possible to reduce strangeness or annoyance to be felt by the driver.

Further, the range of the first region for executing the warning process is reduced in accordance with an increase in driving skill level. For the driver having a high driving skill level, this facilitates executing the sound effect output process rather than simply giving a warning. It is therefore possible to reduce strangeness or annoyance to be felt by the driver.

In addition, even if the drivers have the same driving skill level, the range of the second region for executing the sound effect output process and the range of the third region for executing the warning process are expanded or reduced, depending on the degree (the effect level) of the effect of stabilizing the vehicle body behavior by the sound effect output process. Accordingly, the range of the course difficulty for executing the sound effect output process and the range of the course difficulty for executing the warning process are changed based on the effect level for each driver. This makes it possible to increase the number of opportunities of giving priority to the sound effect output process over the warning process and executing the sound effect output process in accordance with an increase in expectable effect, for the driver, of improving the stability of the vehicle body behavior by the sound effect output process.

Note that also in the first modification, the number of the classifications of the level of the course difficulty, the method of setting the classifications of the first region, the second region, and the third region, and the method of changing the setting of the classifications based on the effect level are not limited to the examples described above.

FIG. 14 is a flowchart illustrating a processing operation of the alerting process according to the first modification. The flowchart illustrated in FIG. 14 additionally includes step S81 as compared with the flowchart illustrated in FIG. 7.

In the first modification, after acquiring the information on the effect level of the driver (step S19), the alerting process unit 67 further acquires information on the driving skill level of the driver (step S81). Further, the alerting process unit 67 sets the respective ranges of the course difficulty for executing the sound effect output process and the warning process, based on the acquired effect level and driving skill level of the driver (step S21). The alerting process unit 67 sets the setting pattern corresponding to the effect level and the driving skill level of the driver to the respective ranges of the course difficulty for executing the sound effect output process and the warning process (see FIGS. 5, 12, and 13). This allows for setting of the first region of the course difficulty for executing the warning process, the second region of the course difficulty for executing the sound effect output process, and the third region of the course difficulty for executing neither the sound effect output process nor the warning process.

The processing in each step other than those described above is executed in a manner similar to that of the processing operation of the alerting process in the embodiment described above. The driving assistance apparatus 100 according to the first modification expands the ranges of the course difficulty for executing the sound effect output process and the warning process in accordance with a relative decrease in the driving skill level of the driver. This facilitates alerting the driver who has a low driving skill level, which enhances driving safety. In contrast, this helps to suppress alerting the driver who has a high driving skill level when the course difficulty is low. It is therefore possible to reduce strangeness or annoyance to be felt by the driver.

2-2. Second Modification

The driving assistance apparatus according to a second modification is configured to change the respective ranges of the difficulty of driving for executing the sound effect output process and the warning process, based on a fatigue degree and a concentration degree of the driver in conjunction with the degree of the effect of stabilizing the vehicle body behavior by the sound effect output process.

FIG. 15 is a block diagram illustrating a configuration example of a driving assistance apparatus 110 according to the second modification. An information processing device 111 of the driving assistance apparatus 110 includes a fatigue degree determination unit 113 as a function of the processor 53. The fatigue degree determination unit 113 estimates an increase in the fatigue degree or a decrease in concentration. For example, the fatigue degree determination unit 113 is configured to observe the driver's pupil based on the image data of the in-vehicle imaging camera, and estimate a decrease in concentration of the driver based on a degree of miosis. Alternatively, the fatigue degree determination unit 113 may observe, for example, the number of times the driver blinks or the number of times the driver yawns based on the image data of the in-vehicle imaging camera, and when the number of times exceeds a predetermined frequency, estimate that the fatigue degree of the driver is increasing or the concentration of the driver is decreasing. However, the method of estimating the fatigue degree or the concentration is not particularly limited, and the fatigue degree determination unit 113 may use a publicly known method to estimate the fatigue degree or the concentration of the driver.

FIG. 16 is an explanatory diagram illustrating an example of the respective ranges of the course difficulty for executing the sound effect output process and the warning process set by the execution range setting process in the second modification, as with FIG. 5. Here, the setting pattern illustrated in FIG. 5 is assumed to be an example in which the setting pattern of the driver who seems not to experience fatigue or not to be decreased in concentration is described for each effect level related to the sound effect output process. The setting pattern illustrated in FIG. 16 is an example in which the setting pattern of the driver who is estimated to be increased in fatigue degree or decreased in concentration is described for each effect level related to the sound effect output process.

When the driver is increased in fatigue degree or decreased in concentration, the range of the third region for executing neither the sound effect output process nor the warning process is reduced, as compared with a case where the driver seems not to experience fatigue or not to be decreased in concentration. That is, when the driver is increased in fatigue degree or decreased in concentration, the respective ranges of the course difficulty for executing the sound effect output process and the warning process are expanded. This facilitates alerting the driver who is increased in fatigue degree or decreased in concentration, which enhances driving safety. In contrast, this helps to suppress alerting the driver who seems not to experience fatigue or not to be decreased in concentration when the course difficulty is low. It is therefore possible to reduce strangeness or annoyance to be felt by the driver.

In addition, even if the drivers have the same fatigue degree or the same concentration, the range of the second region for executing the sound effect output process and the range of the third region for executing the warning process are expanded or reduced, depending on the degree (the effect level) of the effect of stabilizing the vehicle body behavior by the sound effect output process. Accordingly, the range of the course difficulty for executing the sound effect output process and the range of the course difficulty for executing the warning process are changed based on the effect level for each driver. This makes it possible to increase the number of opportunities of giving priority to the sound effect output process over the warning process and executing the sound effect output process in accordance with an increase in expectable effect, for the driver, of improving the stability of the vehicle body behavior by the sound effect output process.

Note that also in the second modification, the number of the classifications of the level of the course difficulty, the method of setting the classifications of the first region, the second region, and the third region, and the method of changing the setting of the classifications based on the effect level are not limited to the examples described above.

FIG. 17 is a flowchart illustrating a processing operation of the alerting process according to the second modification. The flowchart illustrated in FIG. 17 additionally includes step S91 as compared with the flowchart illustrated in FIG. 7.

In the second modification, after acquiring the information on the effect level of the driver (step S19), further, the alerting process unit 67 estimates the fatigue degree or the concentration of the driver (step S91). Further, the alerting process unit 67 sets the respective ranges of the course difficulty for executing the sound effect output process and the warning process, based on the acquired effect level and the fatigue degree or the concentration of the driver (step S21). The alerting process unit 67 sets the setting pattern corresponding to the effect level and the fatigue degree or the concentration of the driver to the respective ranges of the course difficulty for executing the sound effect output process and the warning process (see FIGS. 5 and 16). This allows for setting of the first region of the course difficulty for executing the warning process, the second region of the course difficulty for executing the sound effect output process, and the third region of the course difficulty for executing neither the sound effect output process nor the warning process.

The processing in each step other than those described above is executed in a manner similar to that of the processing operation of the alerting process in the embodiment described above. The driving assistance apparatus 110 according to the second modification expands the respective ranges of the course difficulty for executing the sound effect output process and the warning process when the driver seems to experience fatigue or to be decreased in concentration. This facilitates alerting the driver who seems to experience fatigue or to be decreased in concentration, which enhances driving safety. In contrast, this helps to suppress alerting the driver who seems not to experience fatigue or not to be decreased in concentration when the course difficulty is low. It is therefore possible to reduce strangeness or annoyance to be felt by the driver.

While preferred embodiments of the disclosure have been described above in detail with reference to the accompanying drawings, the technology of the disclosure is not limited thereto. It is apparent to those having ordinary knowledge in the technical field of the disclosure that various modifications and alternations can be made within the scope of the technical idea described in the claims and obviously understood as being included in the technical scope of the disclosure.

For example, in each of the above-described embodiments, described is an example where the information processing device of the driving assistance apparatus is configured as a single device; however, the technology of the disclosure is not limited to such an example. A portion or all of the function of the information processing device 50 may be provided in an external server provided outside the vehicle.

DESCRIPTION OF REFERENCE NUMERALS

1: driving assistance apparatus, 10: vehicle, 11: vehicle body behavior measuring device, 13: surrounding environment detection device, 15: position detection sensor, 17: map data storage, 19: navigation system, 31: sound output device, 40: vehicle controller, 43: electric steering device, 50: information processing device, 51: communicator, 53: processor, 55: storage, 57: effect level storage, 61: acquisition unit, 63: difficulty determination process unit, 65: data processing unit, 67: alerting process unit, 69: effect determination process unit, 80: driving record database, 100: driving assistance apparatus, 101: information processing device, 103: driving skill level storage, 110: driving assistance apparatus, 111: information processing device, 113: fatigue degree determination unit

The invention claimed is:

1. A driving assistance apparatus configured to execute a process of alerting a driver based on a difficulty of driving, the driving assistance apparatus comprising:

one or more processors;

one or more memories communicably coupled to the one or more processors; and an effect level storage that, for the driver, records an effect level indicating a degree to which a sound effect output process causes the driver to operate an own vehicle such that vehicle body behavior of the own vehicle becomes more stable while the driver is driving, the sound effect output process outputting to the driver a sound effect in response to the vehicle body behavior, wherein the one or more processors are configured to:

for each of predetermined sections along which the own vehicle is scheduled to travel, determine a difficulty level on a multi-level difficulty scale, the multi-level difficulty scale being an ordered set of levels;

set, based on the effect level for the driver recorded in the effect level storage, groups of the levels on the multi-level difficulty scale, each group being a set of one or more levels that are adjacent to each other on the multi-level difficulty scale, the groups including a first group and a second group;

assign to the first group a warning process that outputs a warning to the driver, and assign to the second group the sound effect output process that outputs the sound effect to the driver; and for each of the predetermined sections whose difficulty level belongs to the first group or the second group, select one of the warning process and the sound effect output process according to whether the difficulty level of that predetermined section belongs to the first group or the second group, and execute the selected one of the warning process and the sound effect output process, the groups comprise at least three groups including the first group and the second group and further including a third group, the first group corresponds to highest difficulty on the multi-level difficulty scale, the third group corresponds to lowest difficulty on the multi-level difficulty scale, and the second group corresponds to difficulty between the first group and the third group on the multi-level difficulty scale; and the one or more processors are further configured to:

for each of the predetermined sections whose difficulty level belongs to the third group, refrain from executing both the warning process and the sound effect output process; and change, based on the effect level for the driver, the set of levels included in each of the first group, the second group, and the third group on the multi-level difficulty scale.

2. The driving assistance apparatus according to claim 1, wherein, as the effect level for the driver increases, the one or more processors are configured to change the set of levels included in the second group to include more levels on the multi-level difficulty scale and change the set of levels included in the first group to include fewer levels on the multi-level difficulty scale.

3. The driving assistance apparatus according to claim 1, wherein the one or more processors are further configured to:

acquire information on a driving skill of the driver; and based on the driving skill in conjunction with the effect level for the driver, change the set of levels included in each of the first group, the second group, and the third group on the multi-level difficulty scale.

4. The driving assistance apparatus according to claim 3, wherein, as the driving skill of the driver increases, the one or more processors are further configured to change at least the set of levels included in the first group to include fewer levels on the multi-level difficulty scale.

5. The driving assistance apparatus according to claim 1, wherein the one or more processors are further configured to change, based on at least one of a fatigue degree and a concentration degree of the driver in conjunction with the effect level for the driver, the set of levels included in each of the first group, the second group, and the third group on the multi-level difficulty scale.

6. The driving assistance apparatus according to claim 5, wherein, as the fatigue degree of the driver increases or as the concentration degree of the driver decreases, the one or more processors are further configured to change the set of levels included in the third group to include fewer levels on the multi-level difficulty scale.

7. The driving assistance apparatus according to claim 1, wherein the one or more processors are further configured to execute an effect determination process of determining, for the driver, the effect level indicating a degree to which the sound effect output process causes the driver to operate the own vehicle such that vehicle body behavior of the own vehicle becomes more stable while the driver is driving, and recording the effect level in the effect level storage.

8. A non-transitory tangible recording medium in which a computer program is recorded, the computer program causing one or more processors to:

for each of predetermined sections along which an own vehicle is scheduled to travel, determine a difficulty level on a multi-level difficulty scale, the multi-level difficulty scale being an ordered set of levels;

set, based on an effect level for a driver, groups of the levels on the multi-level difficulty scale, each group being a set of one or more levels that are adjacent to each other on the multi-level difficulty scale, the groups including a first group and a second group, wherein, for the driver, the effect level indicates a degree to which a sound effect output process causes the driver to operate the own vehicle such that vehicle body behavior of the own vehicle becomes more stable while the driver is driving, and the sound effect output process outputs to the driver a sound effect in response to the vehicle body behavior;

assign to the first group a warning process that outputs a warning to the driver, and assign to the second group the sound effect output process that outputs the sound effect to the driver; and for each of the predetermined sections whose difficulty level belongs to the first group or the second group, select one of the warning process and the sound effect output process according to whether the difficulty level of that predetermined section belongs to the first group or the second group, and execute the selected one of the warning process and the sound effect output process, wherein the groups comprise at least three groups including the first group and the second group and further including a third group, the first group corresponds to highest difficulty on the multi-level difficulty scale, the third group corresponds to lowest difficulty on the multi-level difficulty scale, and the second group corresponds to difficulty between the first group and the third group on the multi-level difficulty scale; and the computer program further causes the one or more processors to:

for each of the predetermined sections whose difficulty level belongs to the third group, refrain from executing both the warning process and the sound effect output process; and change, based on the effect level for the driver, the set of levels included in each of the first group, the second group, and the third group on the multi-level difficulty scale.

9. The non-transitory tangible recording medium according to claim 8, wherein, as the effect level for the driver increases, the computer program further causes the one or more processors to change the set of levels included in the second group to include more levels on the multi-level difficulty scale and change the set of levels included in the first group to include fewer levels on the multi-level difficulty scale.

10. The non-transitory tangible recording medium according to claim 8, wherein the computer program further causes the one or more processors to:

acquire information on a driving skill of the driver; and based on the driving skill in conjunction with the effect level for the driver, change the set of levels included in each of the first group, the second group, and the third group on the multi-level difficulty scale.

11. The non-transitory tangible recording medium according to claim 10, wherein, as the driving skill of the driver increases, the computer program further causes the one or more processors to change at least the set of levels included in the first group to include fewer levels on the multi-level difficulty scale.

12. The non-transitory tangible recording medium according to claim 8, wherein the computer program further causes the one or more processors to change, based on at least one of a fatigue degree and a concentration degree of the driver in conjunction with the effect level for the driver, the set of levels included in each of the first group, the second group, and the third group on the multi-level difficulty scale.

13. The non-transitory tangible recording medium according to claim 12, wherein, as the fatigue degree of the driver increases or as the concentration degree of the driver decreases, the computer program further causes the one or more processors to change the set of levels included in the third group to include fewer levels on the multi-level difficulty scale.

14. The non-transitory tangible recording medium according to claim 8, wherein the computer program further causes the one or more processors to execute an effect determination process of determining, for the driver, the effect level indicating a degree to which the sound effect output process causes the driver to operate the own vehicle such that vehicle body behavior of the own vehicle becomes more stable while the driver is driving, and recording the effect level in an effect level storage.

* * * * *